US005384699A

United States Patent [19]

Levy et al.

[11] Patent Number: 5,384,699

[45] Date of Patent: Jan. 24, 1995

[54] PREVENTIVE MAINTENANCE SYSTEM FOR THE PHOTOMULTIPLIER DETECTOR BLOCKS OF PET SCANNERS

[75] Inventors: Alejandro V. Levy, Center Moriches; Donald Warner, Shirley, both of N.Y.

[73] Assignee: Associated Universities, Inc., Washington, D.C.

[21] Appl. No.: 934,714

[22] Filed: Aug. 24, 1992

[51] Int. Cl.[6] ............ G06F 15/20

[52] U.S. Cl. ............ 364/413.13; 364/551.01

[58] Field of Search ............ 364/413.13, 551.01, 364/551.02

[56] References Cited

U.S. PATENT DOCUMENTS

| | | | |
|---|---|---|---|
| 4,831,564 | 5/1989 | Suga | 364/551.01 |
| 4,905,287 | 2/1990 | Segawa | 381/43 |

OTHER PUBLICATIONS

Burle Industries Inc., "Photomultiplier Handbook", *TP-136*, 9(1989).

Hayashi, "Use of Photomultiplier Tubes in Scintillation Applications", *Application Res-0790, Chap. 111-7: Pulse Height Stability*, p. 5, Hamamatsu TV Co., Ltd. (1990).

Siemens Catalog "Three-Dimensional Positron Emission Tomography (PET) ACAT SCANNER", Siemens Gammasonics, Inc., Nuclear PET Group, Knoxville, Tenn., illustrating parts of a CTI-931 PET scanner's detector-photomultiplier bucket system for photon position decoding (undated).

Siemens, "Operating Instructions, Positron Emission Tomography Systems", Publication #98 76 392, Chapter 5.5: Utilities Menu, Section 5.5.3: System Calibration and Normalization, starting on p. 5-308 (Revision A, Jun. 1989).

*Primary Examiner*—Roy N. Envall, Jr.
*Assistant Examiner*—J. L. Hazard
*Attorney, Agent, or Firm*—Margaret C. Bogosian

[57] ABSTRACT

A system including a method and apparatus for preventive maintenance of PET scanner photomultiplier detector blocks is disclosed. The quantitive comparisons used in the method of the present invention to provide an indication in the form of a display or printout advising the user that the photomultiplier block is stable, intermittently unstable, or drifting unstable, and also advising of the expected date of failure of a photomultiplier block in the PET scanner. The system alerts the user to replace the defective photomultiplier block prior to catastrophic failure in a scheduled preventative maintenance program, thus eliminating expensive and unscheduled downtime of the PET scanner due to photomultiplier failure. The apparatus for carrying out the method of the present invention preferably resides in the host computer controlling a PET scanner. It includes a memory adapted for storing a record of a number of iterative adjustments that are necessary to calibrate the gain of a photomultiplier detector block i at a time $t_0$, a time $t_1$ and a time T, where $T>t_1>t_0$, which is designated as Histo(i,j(t)). The apparatus also includes a processor configured by a software program or a combination of programmed RAM and ROM devices to perform a number of calculations and operations on these values, and also includes a counter for analyzing each photomultiplier detector block i=1 through I of a PET scanner.

27 Claims, 18 Drawing Sheets

PREVENTIVE MAINTENANCE SYSTEM FOR THE PHOTOMULTIPLIER DETECTOR BLOCKS OF PET SCANNERS

This invention was made with Government support under contract number DE-AC02-76CH00016, between the U.S. Department of Energy and Associated Universities, Inc. The Government has certain rights in the invention.

BACKGROUND OF THE INVENTION

1. Field of the Invention

The present invention relates to a system for the preventive maintenance of the Photomultiplier Detector Blocks of PET Scanners. This system is used to automatically indicate the expected date of failure of a photomultiplier detector block and provide time for its replacement and maintenance in a scheduled preventive maintenance program, thus eliminating expensive unscheduled downtime of a PET Scanner due to photomultiplier failure.

2. Background of the Related Art

Positron Emission Tomography (PET) scanners typically contain several hundred photomultipliers (PMTs) usually arranged in blocks of four (4) PMTs for detecting gamma radiation. A PMT is an electronic amplifier with an extremely high gain; they are used in PET scanners to amplify a signal up to 100 million times. Photomultiplier tubes are not noted for great stability, and due to its construction characteristics, as it ages the gain of a PMT drifts in time. Therefore, each PMT requires periodic calibration See, Burle Industries Inc., "Photomultiplier Handbook", *TP*-136, 9 (1989); and Hayashi, "Use of Photomultiplier Tubes in Scintillation Applications", Application Res-0790, Chap. 111-7: Pulse Height Stability, page 5, Hamamatsu TV Co., LTD. (1990).

During the use of a PET scanner the magnitude of gain fluctuations of these photomultipliers can become so large that the photomultipliers cannot be calibrated, disabling the scanner until the detector blocks containing the defective photomultipliers are replaced. PET scanner manufacturers attempt to avoid photomultiplier failure by selecting photomultipliers which successfully complete an aging process over several hours, called burn-in testing. This testing, however, cannot predict the behavior of these photomultipliers months or years after being put into service. To account for the aging of the photomultipliers, the PET scanner must be periodically recalibrated, typically once a week by iteratively attenuating the gain of the photomultipliers in each detector block.

Accordingly, in the sale of a PET scanner and its host computer system, each company provides a gain control program to allow automatic adjustment of the PMT gain in each detector block. This type of computer program is routinely provided to the buyer, along with many other software programs required for the correct operation of the PET scanner. Although the PMT calibration is a basic necessity of the PET scanner, and the information is routinely available to the user, none of the manufacturers provide an automatic system for the preventative maintenance of the PMT detector blocks. Rather, all of the PET scanner manufacturers replace a PMT detector block only after it has failed. Since the cost of a typical PET scanner ranges from more than one million ($1,000,000.00) to over two million ($2,000,000.00) dollars, manufacturers are aware of the value to their customers of purchasing a highly reliable PET scanner.

The following manufacturers utilize several hundred PMTs in each of their PET scanner models listed below. All of these PET scanners require periodic calibration of their PMT gains by the user, utilizing the control program supplied with the host computer system that controls the scanner. Therefore, each would greatly benefit from an automatic preventative maintenance system.

SIEMENS MEDICAL SYSTEMS
Location: 111 Northfield Ave., West Orange, N.J., 07052
PET Scanner CTI-931, CTI-951, CTI-953, EXACT 31,
Models: EXACT 47
Cost: From $2,200,000.00 to $2,600,000.00

GENERAL ELECTRIC MEDICAL SYSTEMS
Location: P.O. Box 414, Milwaukee, Wis., 53201
PET Scanner
Models: PC-384, PC-1024, PC-2048, PC-4096
Cost: From $2,000,000.00 to $2,500,000.00

PHOTONICS RESEARCH CORPORATION (HAMAMATSU)
Location: P.O. Box 6910, 360 Foothill Road, Bridgewater, N.J., 08807
PET Scanner
Model: SHR-5000 (for animals only)
Cost: $1,100,000.00

UGM MEDICAL SYSTEMS
Location: 3401 Market Street, Suite 272, Philadelphia, Pa., 19104
PET Scanner
Model: PENN-PET-300-H
Cost: $1,300,000.00

During the useful lifetime of a PET scanner, one or more detector blocks will unexpectedly reach their limit of calibration range causing failure of the PET scanner. Since all of the above PET scanner manufacturers presently replace PMT blocks only after they have reached their limit of calibration range and have failed, the scanner must be turned off for one to two days. The user must typically wait for the repair technician to arrive, change the defective PMT blocks and recalibrate the scanner with the newly installed PMT blocks.

The unexpected loss of a PET scanner due to failure of a PMT block is very costly. In a hospital environment, which performs fast routine clinical tests, patient cancellations could amount to over $8,000.00 per day. In a research environment, such as BNL or a University, the cost of an unexpected PET scanner failure is even higher. Failure of the scanner may result in the cancellation of serial planned studies requiring the preparation of expensive and highly perishable medications. Cancellation may also disrupt experiments conducted under very stringent research protocols that monitor the development over time of an experimental treatment, which can not be easily duplicated. The loss of funds for research personnel and research equipment left idle by the scanner's failure, such as the associated research cyclotron and the chemists who prepare the experimental medications with an attached tracer isotope, is extremely high and can cause the budget allocated to a research project to be exceeded.

Accordingly, it would be desirable to provide a system for predicting when photomultiplier detector blocks should be routinely replaced prior to reaching their limit of calibration range, thus avoiding interruption of the use of the PET scanner due to failure of photomultiplier detector blocks.

SUMMARY OF THE INVENTION

These objectives have been satisfied by the present invention which provides a method and apparatus for preventive maintenance of PET scanner photomultiplier detector blocks. The quantitive comparisons used in the method of the present invention provide an indication to the user of the expected date of failure of a photomultiplier block in the PET scanner and advises its replacement prior to catastrophic failure in a schedule preventative maintenance program. The present invention, therefore, eliminates expensive and unscheduled downtime of the PET scanner due to photomultiplier failure. Preferably, the apparatus for carrying out the method of the present invention includes in the host computer controlling a PET scanner a memory adapted for storing:

(1) a record of a number of iterative adjustments that are necessary to calibrate the gain of a photomultiplier detector block i at a time $t_0$, a time $t_1$ and a time T, where $T>t_1>t_0$, which is designated as Histo(i,j(t)), where i is an integer from 1 through I, denoting the number of the specific photomultiplier detector blocks, where I is the total number of detector blocks in the PET scanner. Also in file Histo(i,j(t)), j is an integer from 1 through J to denote the sequential number of the iterative adjustments required to calibrate the particular photomultiplier detector block i, at a particular time t, in which J denotes the number of the last available iterative adjustment made on the last time t=T;

(2) an average value designated av(i), and a standard deviation value designated sd(i).

The central processor of the host computer is also configured, preferably by means of a software program or a combination of RAM and ROM devices to perform the following calculations and operations:

(1) compute the average number of iterative adjustments necessary to calibrate said detector block for said time $t_0$ through said time T, and store the average value through time T in memory;

(2) compute the standard deviation of the number of iterative adjustments necessary to calibrate the detector block for time $t_0$ through time T, and store the standard deviation value through time T in memory;

(3) compute at time T if the following conditions are satisfied:

Histo(i,j(T))>av(i)+2sd(i) to determine whether the detector block i is an intermittent unstable block;

(4) compute at time T if the following conditions are satisfied:

Histo(i,J(T))>Histo(i,j(T−1))>Histo(i,j(T−2))>av(i); to determine whether the detector block i is a drifting unstable block;

(5) determine that the photomultiplier block i is a stable detector block if the detector block i is not an intermittent unstable detector block and is not a drifting unstable detector block;

(6) compute if the number of iterative adjustments required to calibrate the photomultiplier detector block at time T is greater than or equal to a predetermined number, which in the case of the CTI-931 PET scanner is 15, designating the photomultiplier detector block limit of calibration range, to determine whether the photomultiplier detector block i is at its calibration range limit and should be replaced or serviced.

Alternatively, if the processor determines that the detector block i is a drifting unstable block at time T, and the number of iterations is less than the predetermined number designating the photomultiplier detector block limit of calibration range, preferably 15 as described above, then the processor also is configured to:

(8) compute a time of failure of detector block i, designated tf(i), when detector block i will reach its predetermined calibration range limit of iterative adjustments, preferably 15 as described above, designated Histo(i,j(tf(i))) by satisfying the equation:

$$tf(i)=[-B+\{BB-4\,A(C-Z)\}exp0.5]/2A$$

in which,

A=0.5[Histo(i,j(T−2))-2 Histo(i,j(T−1))+Histo(i,J(T))],

B=−0.5[3 Histo(i,j(T−2))-4 Histo(i,j(T−1))+Histo(i,J(T))],

C=Histo(i,j(T−2)), and

Z=the predetermined calibration range limit of iterative adjustments, preferably 15 as described above, and causing the value for tf(i) to be stored in memory; and (9) generate an output signal, preferably causing the host computer to print or display an advise that photomultiplier detector block i is a drifting unstable block i at time T, and probably will reach the limit of its calibration range at a time=(T−2)+tf(i). If the processor determines that block i has reached its calibration limit the processor is further configured to:

(10) generate an output signal, preferably by causing the host computer to print or display an advise that photomultiplier detector block i is a drifting unstable block at time T, and to change or service said block i as soon as possible to avoid photomultiplier block failure, since it has reached the limit of its calibration range.

If the processor determines that detector block i is a stable detector block at time T, the processor is further configured to:

(6) compute if the value of Hist(i,J(T)) is greater than or equal to a predetermined number, preferably 15 as described above, designating the photomultiplier detector block limit of calibration range to determine if detector block i has reached its calibration range limit and should be replaced or serviced. If the processor determines that the detector block i is a stable detector block and has not reached its calibration range limit at time T, it is further configured to:

(1) compute if the value of av(i) is less than a first predetermined value, preferably 3 in the case of the photomultiplier detector blocks utilized in the CTI-931 PET scanner, to determine that detector block i has a high degree of stability;

(2) compute if the value of av(i) is greater than or equal to said first predetermined value, preferably 3 as described above, and less than a second predetermined value, preferably 5 in the case of the photomultiplier detector blocks utilized in the CTI-931 PET scanner, to determine that detector block i has a medium degree of stability; and (3) compute if the value of av(i) is greater than or equal to the second predetermined value, preferably 5 as described above, to determine that detector block i has a marginal degree of stability;

(4) store in memory that detector block i at time T is a stable detector block with either a high degree of stability, a medium degree of stability, or a marginal degree of stability;

(5) generate an output signal, preferably causing the host computer to print or display an advise that at time t=T photomultiplier detector block i is a stable detector block and that photomultiplier detector block i has the particular av(i), sd(i) and the particular degree of stability as calculated above.

If the processor determines that photomultiplier detector block i is stable, but has reached its calibration range limit, preferably 15 as described above, then it is configured to:

(7) generate an output signal, preferably causing the host computer to print or display an advise that at time T photomultiplier detector block i is a stable detector block, and has reached its calibration range limit and should be replaced as soon as possible to avoid photomultiplier detector block failure in the system.

The preventive maintenance system of the present invention preferably is designed to analyze all of the photomultiplier detector blocks of a PET scanner. Accordingly, the processor preferably includes a counter for analyzing each photomultiplier detector block i=1 through I of a PET scanner, in which I is a total number of photomultiplier detector blocks of the PET scanner to be calibrated. In carrying out the method of the present invention the PET scanner is periodically calibrated, preferably once a week. Therefore, the processor is configured to actuate the memory in order to store each of the values generated from time $t=t_0$ through T, and to periodically update each of the values generated as described above for the PET scanner.

For better understanding of the present invention, reference is made to the forgoing description, appendix and accompanying figures, the scope of which is pointed out in the claims.

BRIEF DESCRIPTION OF THE DRAWINGS

FIG. 2(*b*) is a graph illustrating the behavior pattern of an intermittent unstable PMT block plotting the number of iterations over the same year as in FIG. 2(*a*); FIG. 2(*c*) is a graph illustrating the behavior pattern of a drifting unstable PMT block plotting the number of iterations over the same year as in FIG. 2(*a*); FIG. 2(*d*) is a graph illustrating the main drift pattern of an unstable PMT block plotting the number of iterations over time (in weeks).

FIG. 3 is a graph plotting the quadratic fit to the main drift pattern illustrated in FIG. 2(*d*), in which the number of iterations are plotted on the Y axis and time (in weeks) is plotted on the X axis, wherein:

$$Y=4.1540-0.18513X+5.0408e-2X^2,$$

with a degree of fit $R^2=0.998$.

Figure 4A:
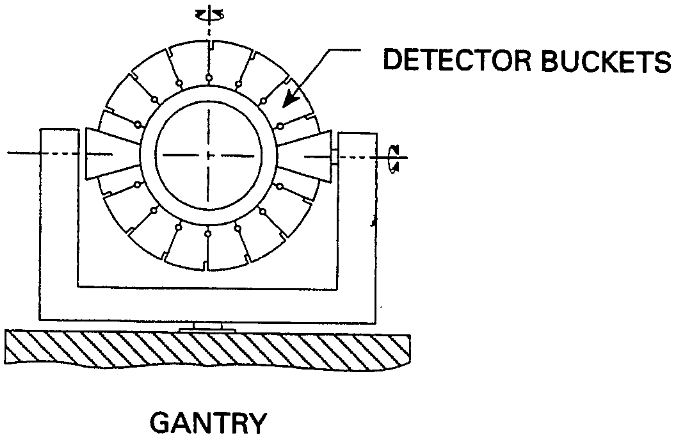
Figure 4B:
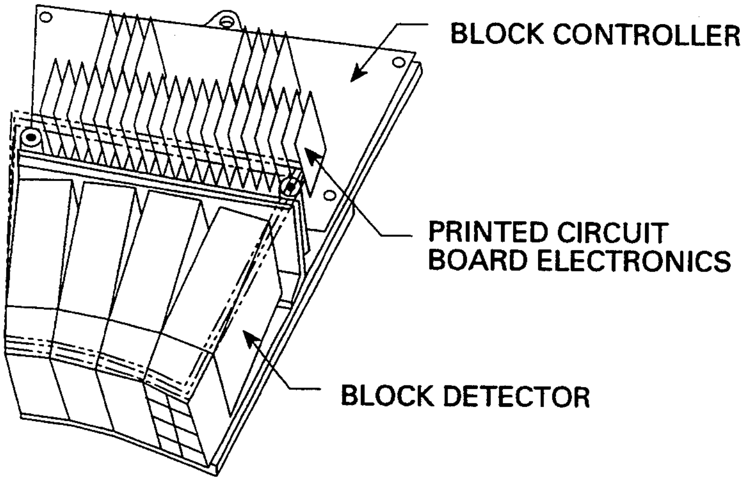
Figure 4C:
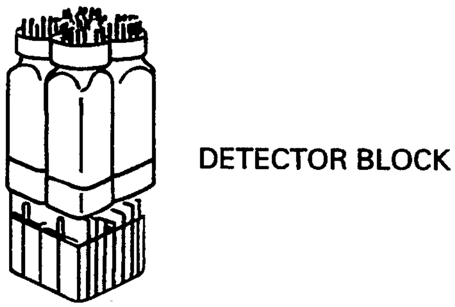
Figure 5A:
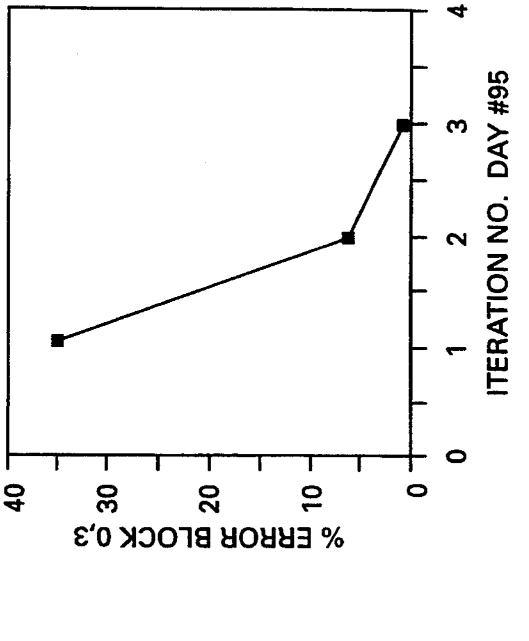
Figure 5B:
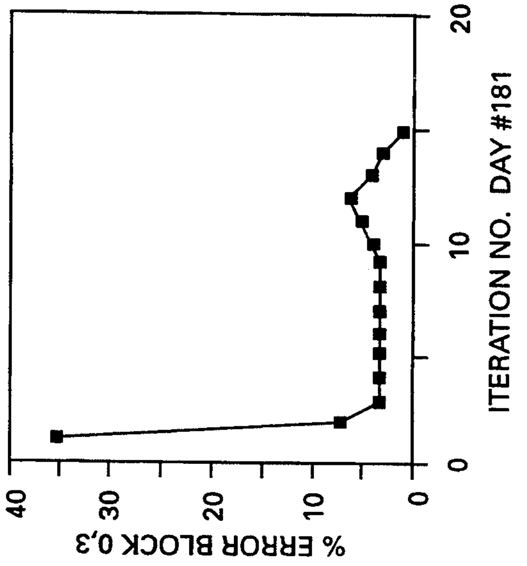
Figure 5C:
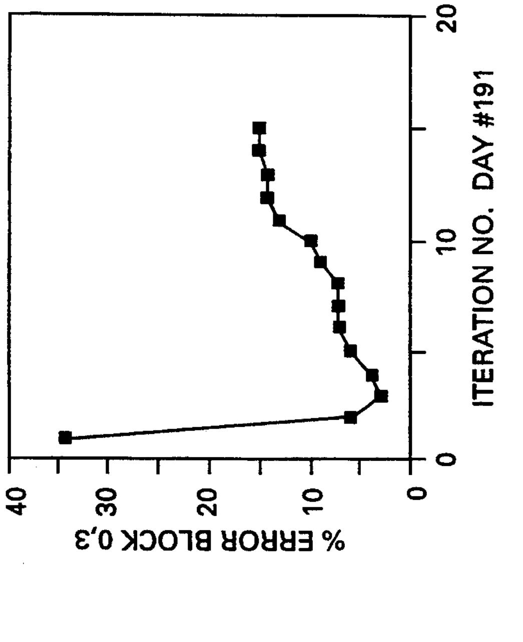
Figure 5D:
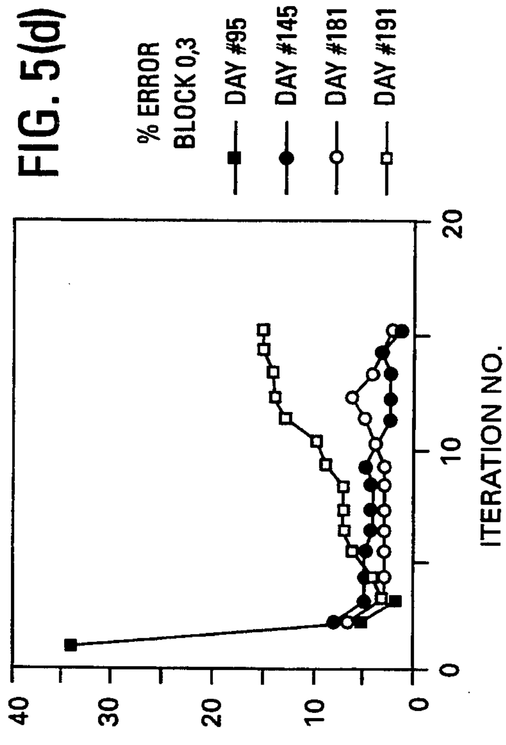
Figure 6A:
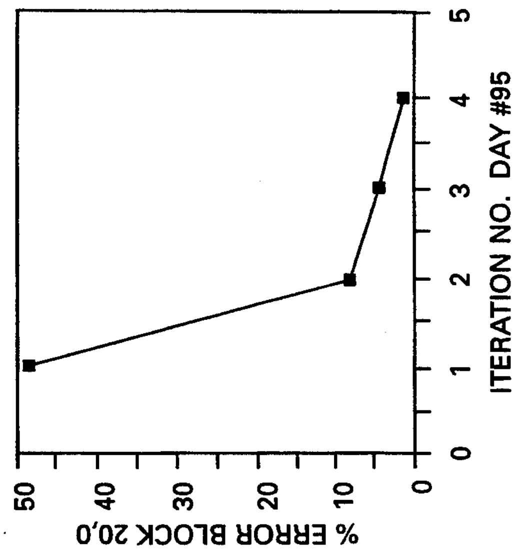
Figure 6B:
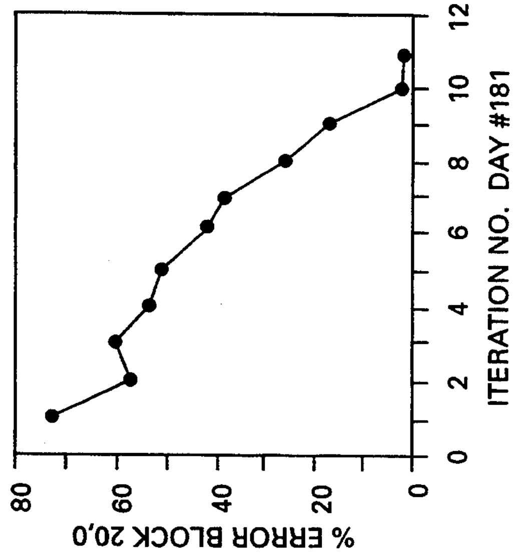
Figure 6C:
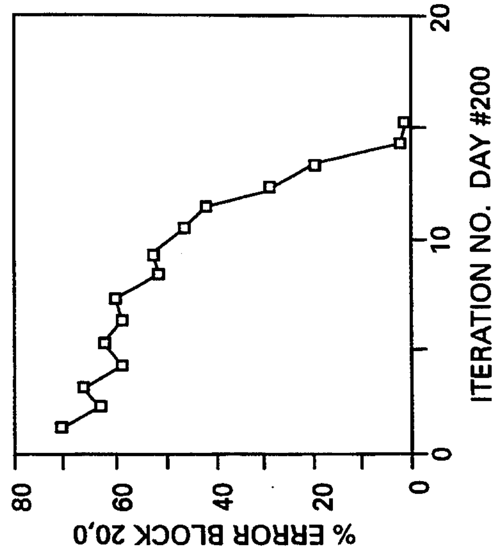
Figure 6D:
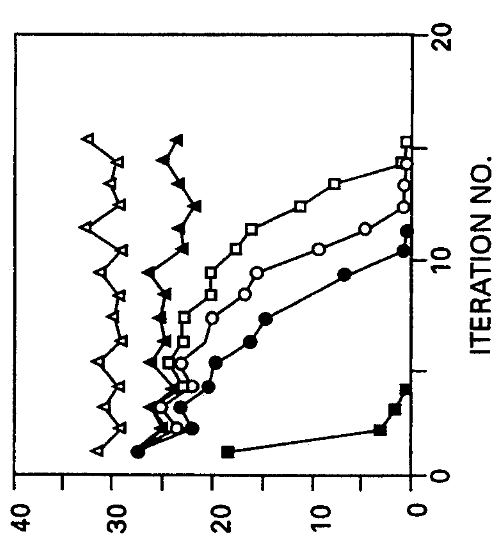

FIG. 4(*a*), 4(*b*) and 4(*c*) are excerpted from the CTI-931 Technical Manual, Siemens Gammasonics, Inc., Nuclear PET Group, Knoxville, Tenn., illustrating parts of a CTI-931 PET scanner's detector-photomultiplier bucket system for photon position decoding; 4(*a*) an elevational vertical cross-sectional view of the detector showing the buckets circumferentially arranged about the gantry; 4(*b*) is a schematic perspective view of a single bucket containing four (4) PMT detector blocks; and 4(*c*) is a schematic elevational perspective view of a PMT detector block showing the four (4) photomultipliers.

FIGS. 5(*a*), 5(*b*), 5(*c*) and 5(*d*) show four (4) graphs illustrating the performance of an intermittent unstable PMT block plotting the % of error of block (0,3) versus number of iterative gain adjustments required on a particular day to calibrate the gain of the four (4) PMTs in the block, 5(*a*) on day #95; 5(*b*) on day #181; 5(*c*) on day #191 when block (0,3) reached the limit of its calibration range; and 5(*d*) showing graphs 5(*a*), 5(*b*), and 5(*c*) superimposed with day #145, showing the number of iterative gain adjustments required to equalize the counts of the four (4) photomultipliers in block (0,3) from day to day.

FIGS. 6(*a*), 6(*b*), 6(*c*) and 6(*d*) show four (4) graphs illustrating the performance of a drifting unstable PMT detector block plotting the % error of block (20,0) versus the number of iterative gain adjustments required on a particular day to calibrate the gain of the four (4) PMTs in the block, 6(*a*) on day #95, 6(*b*) on day #181, 6(*c*) on day #200, and 6(*d*) showing graphs 6(*a*), 6(*b*), and 6(*c*) superimposed with day #'s 191, 228 and 242 after block (20,0) failed.

Figure 7A:
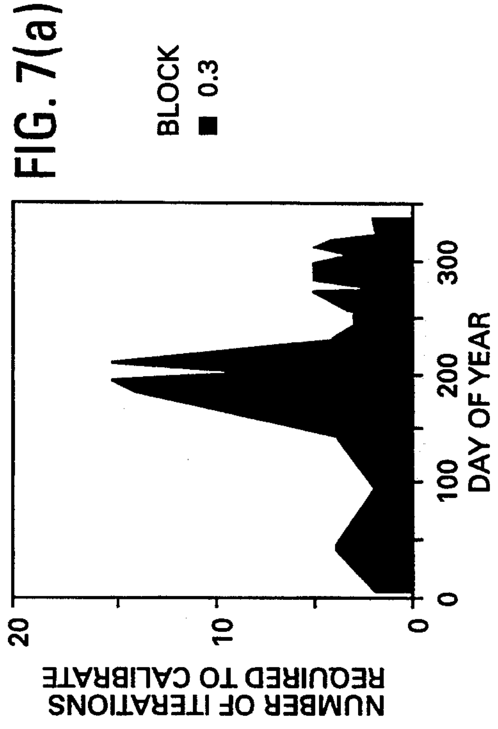
Figure 7B:
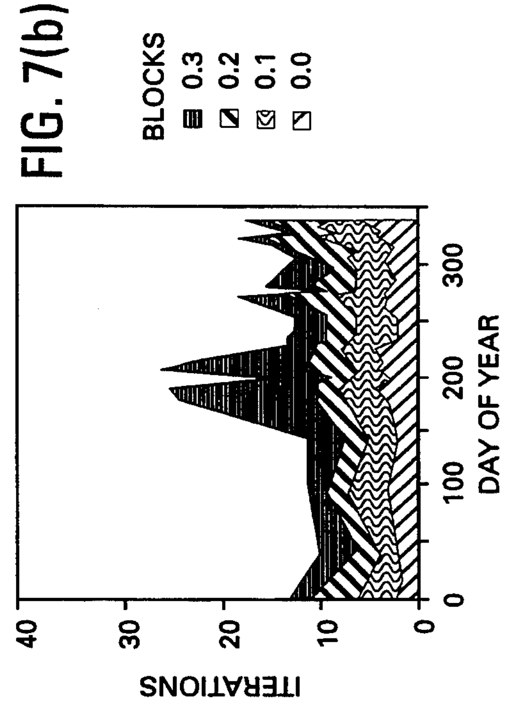

FIG. 7(*a*) is a graph illustrating the behavior pattern of an intermittent unstable photomultiplier block (0,3) plotting the number of iterations required to calibrate the block over a year; FIG. 7(*b*) shows the superimposed patterns of the four (4) photomultiplier blocks (0,3), (0,2), (0,1), and (0,0), in detector-photomultiplier bucket 0, plotting the total number of iterations over a year.

Figure 8A:
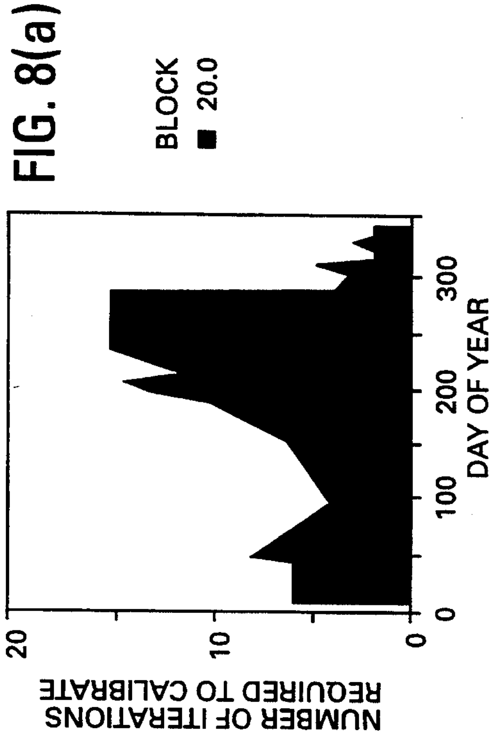
Figure 8B:
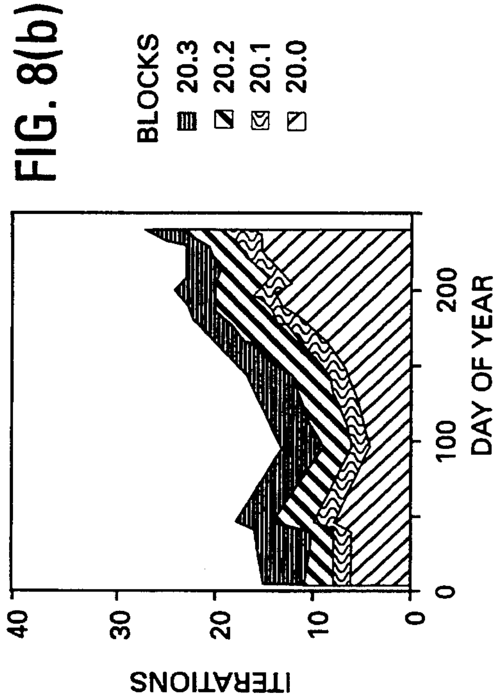
Figure 9A:
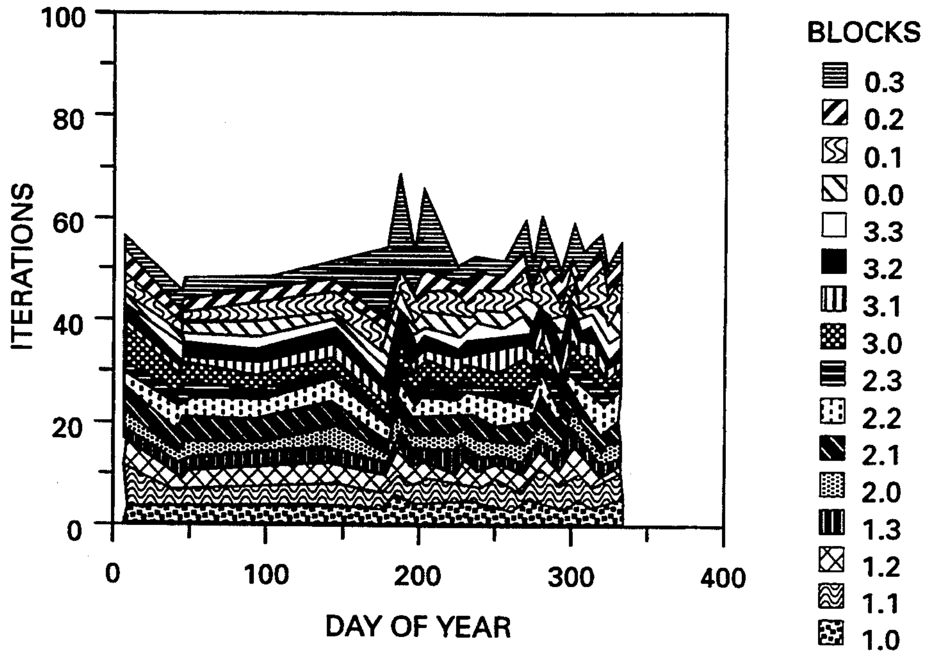
Figure 9B:
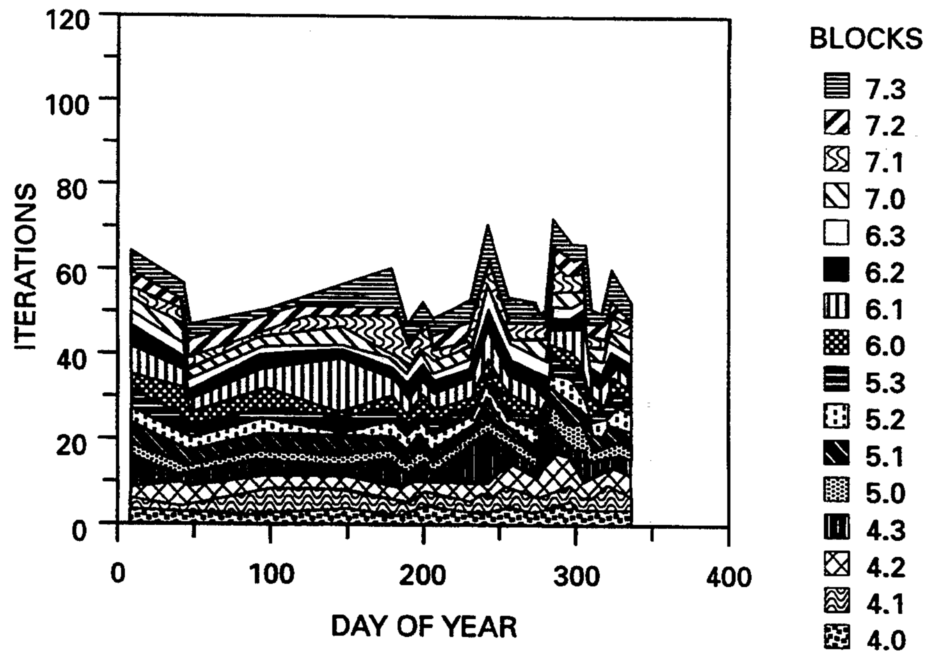
Figure 9C:
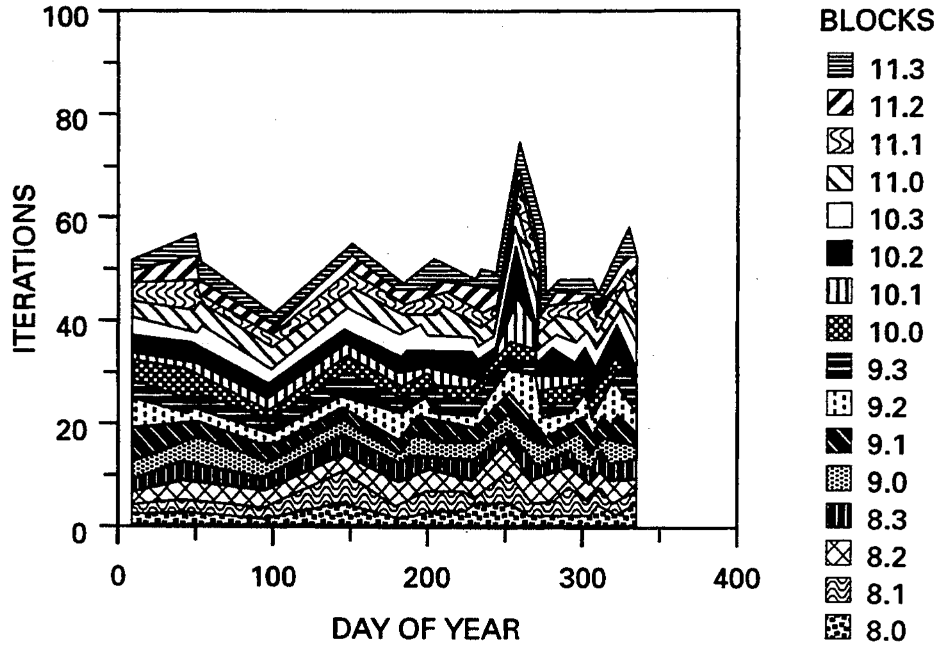
Figure 9D:
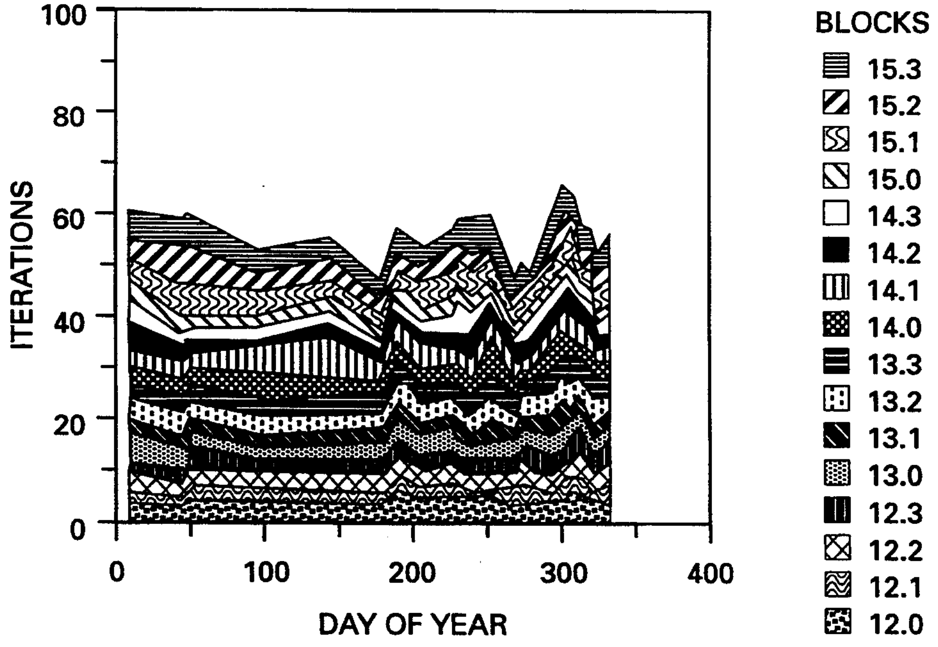
Figure 10A:
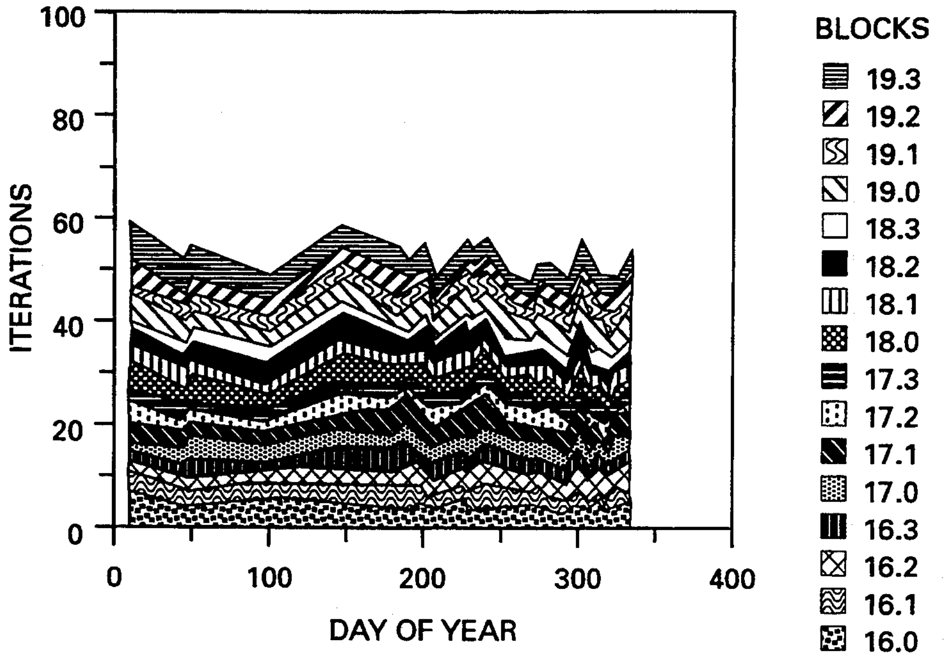
Figure 10B:
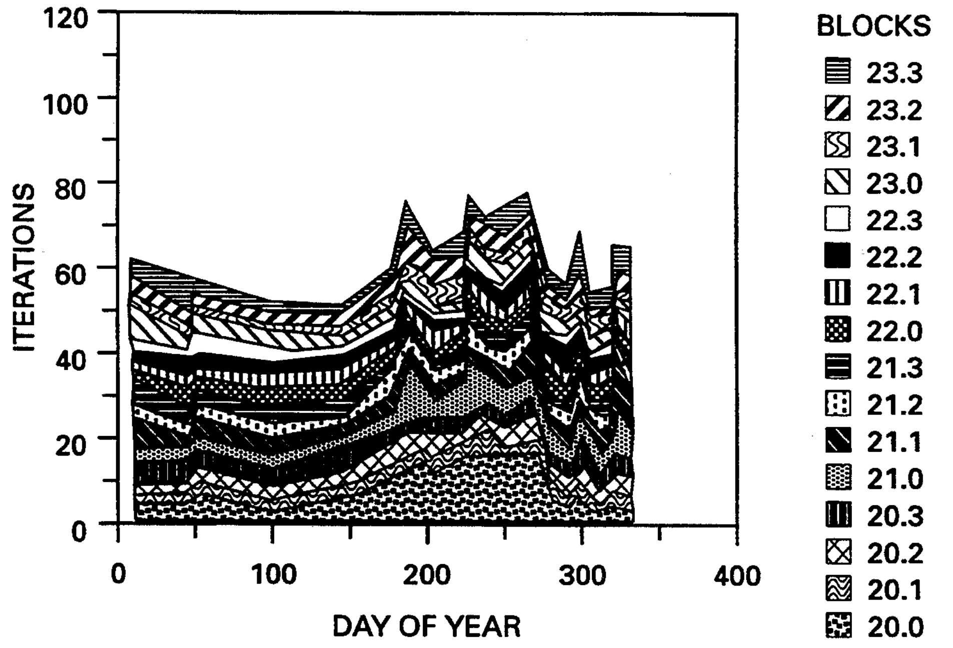
Figure 10C:
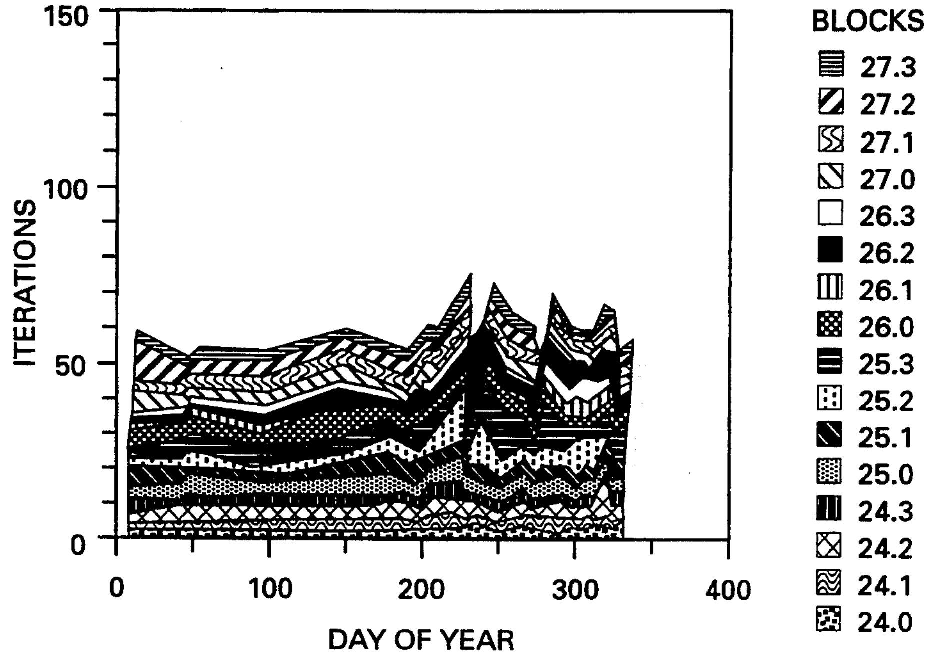
Figure 10D:
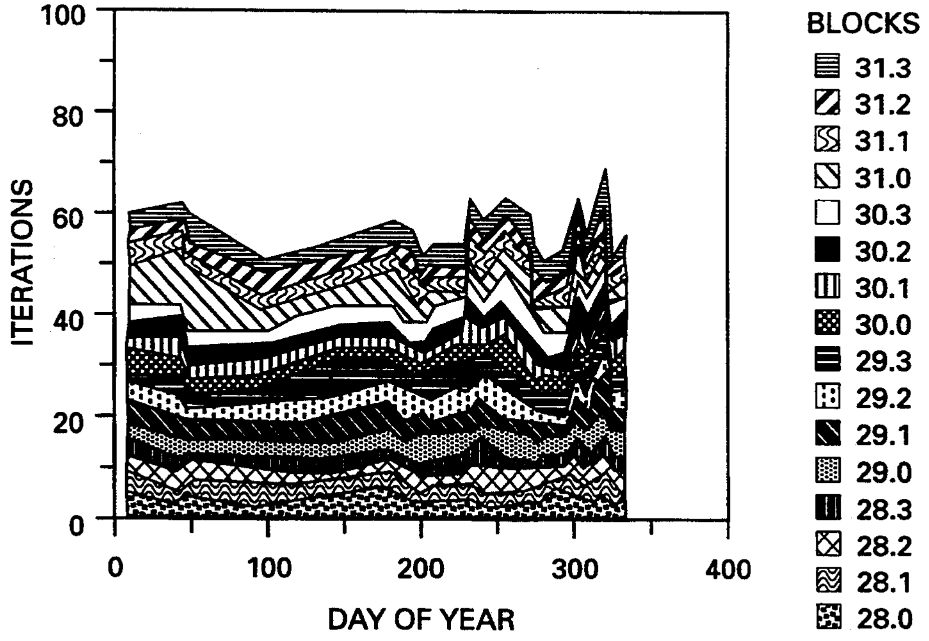
Figure 11A:
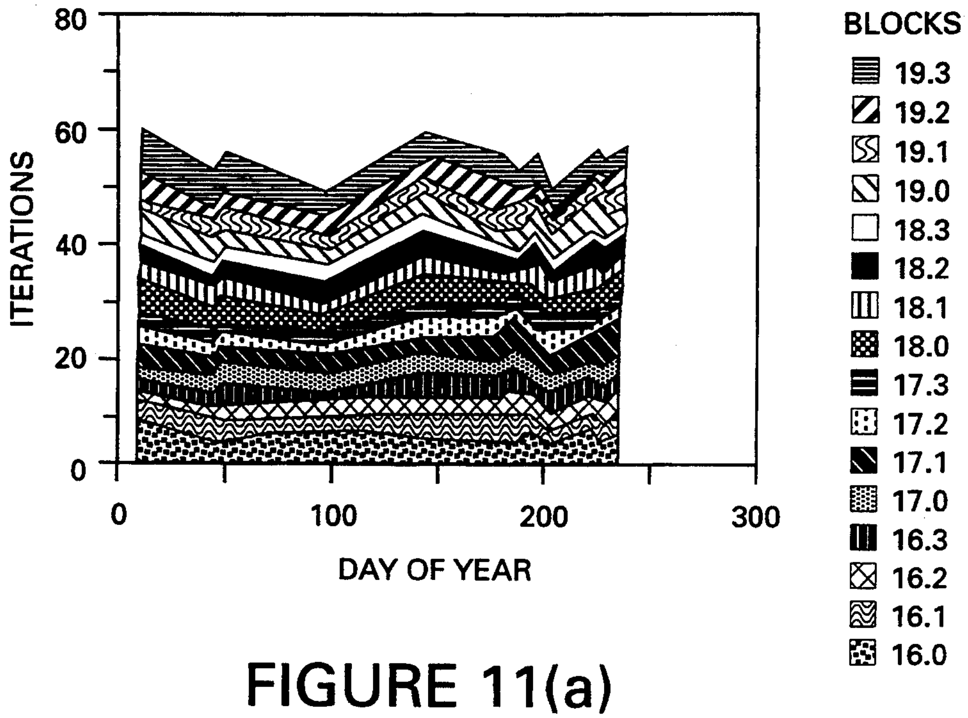
Figure 11B:
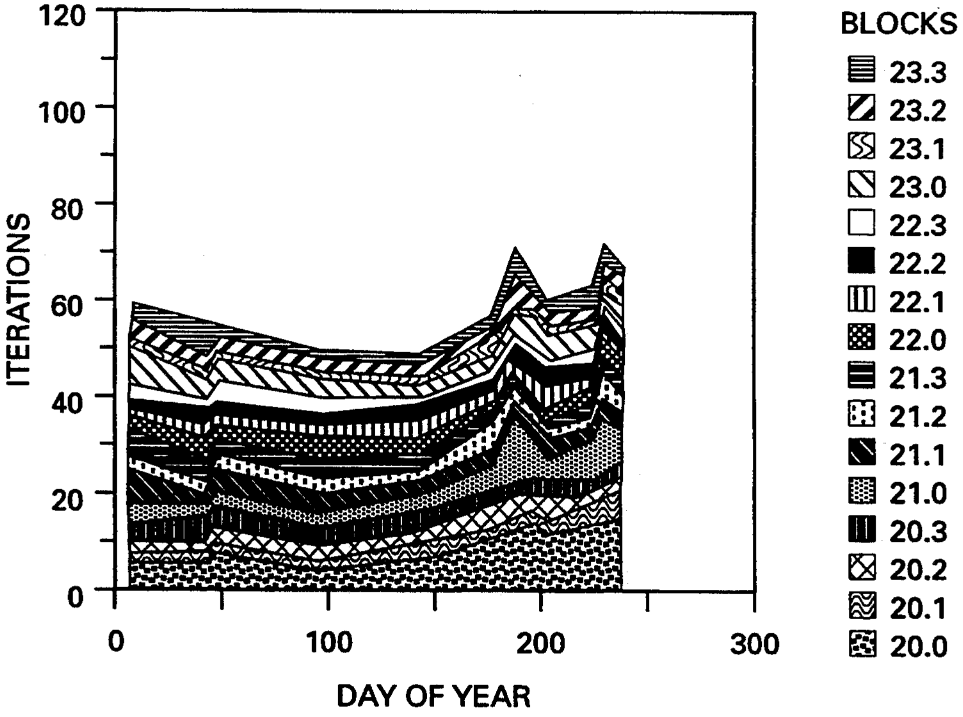
Figure 11C:
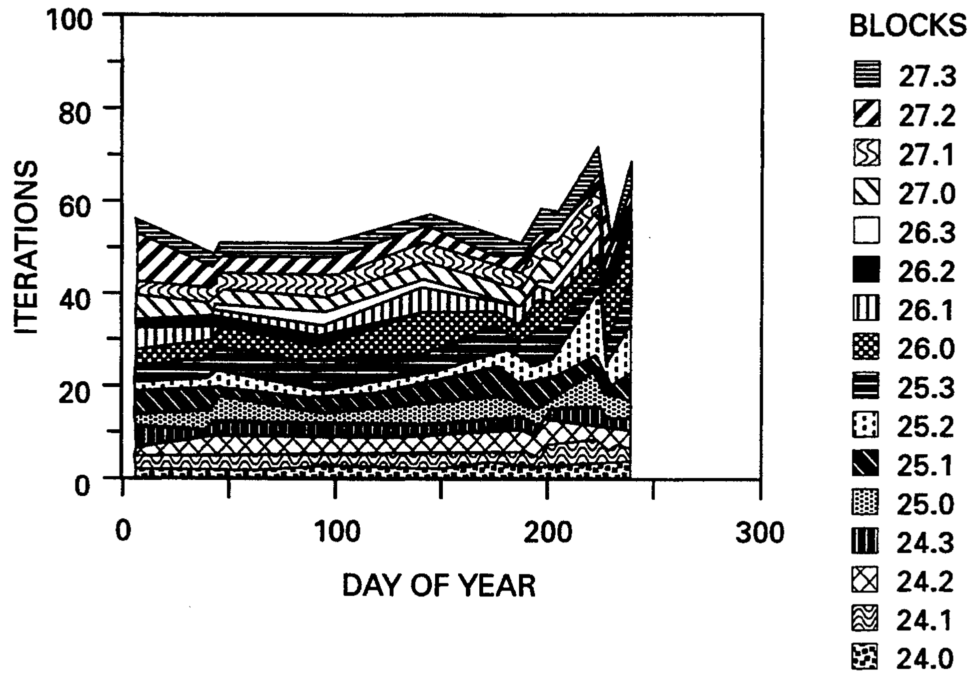
Figure 11D:
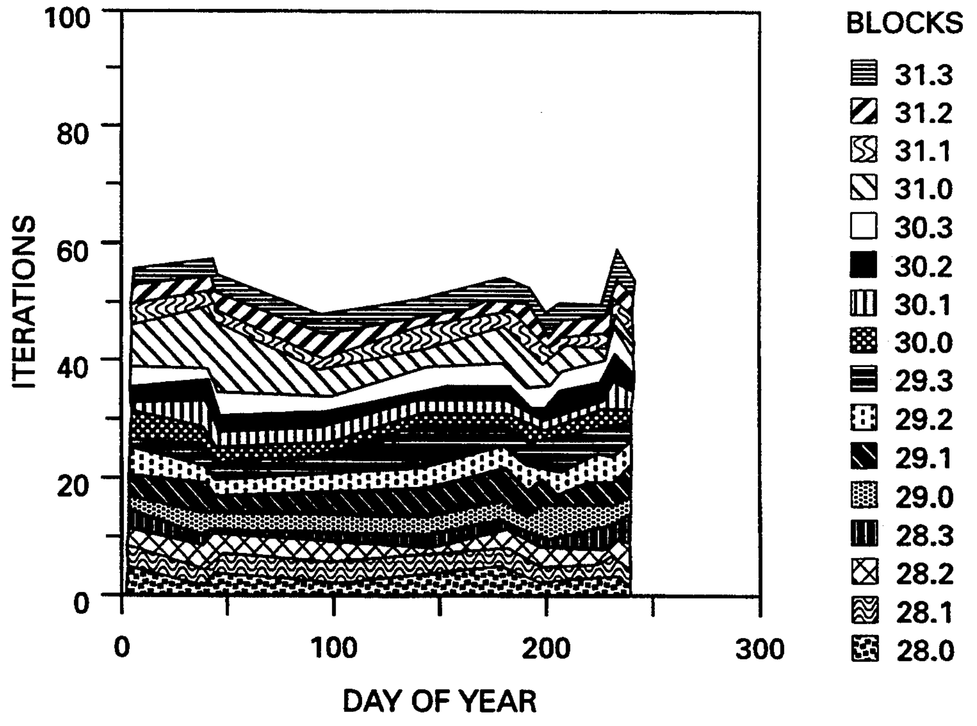
Figure 12A:
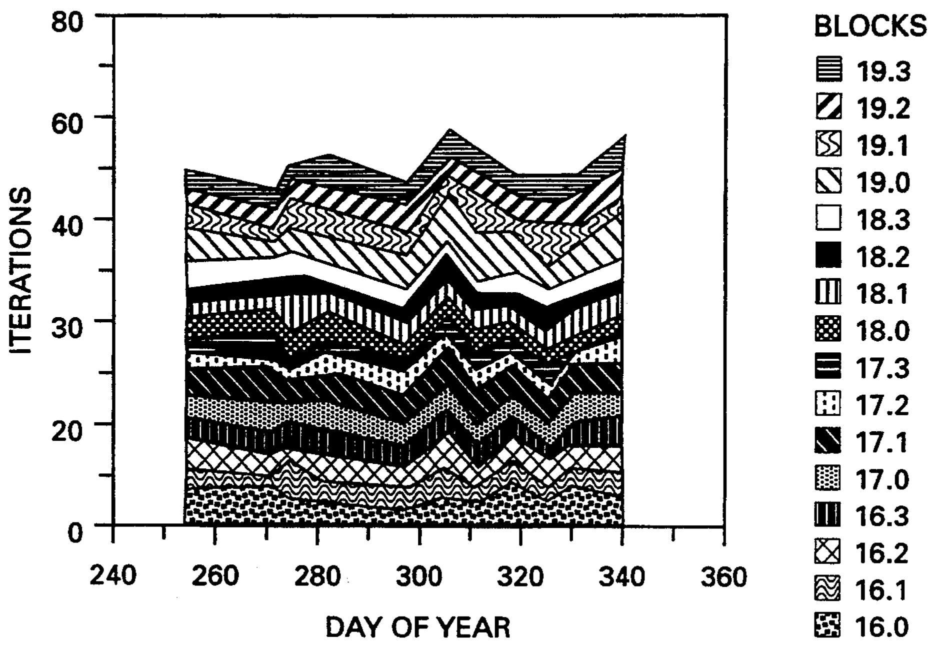
Figure 12B:
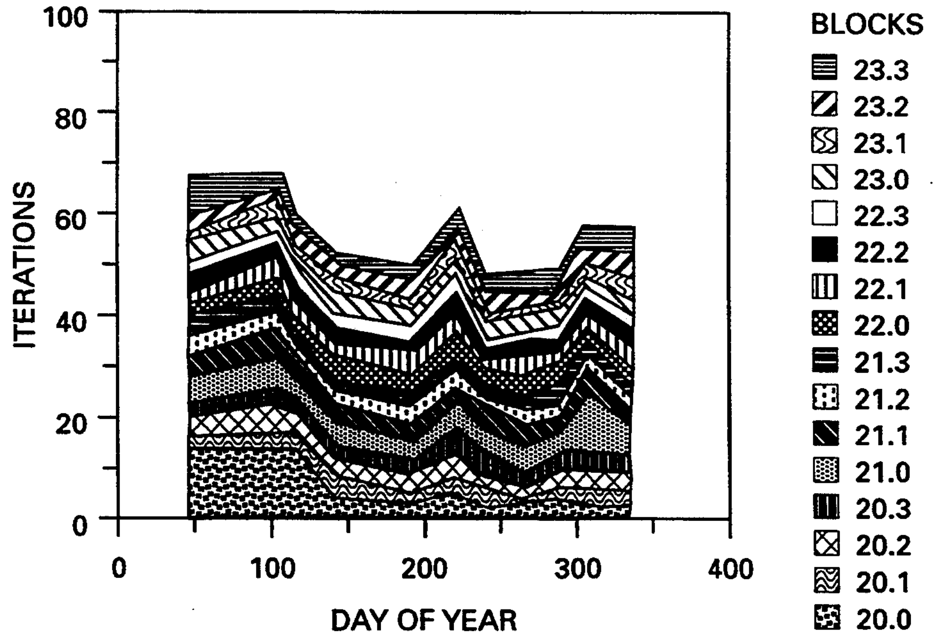
Figure 12C:
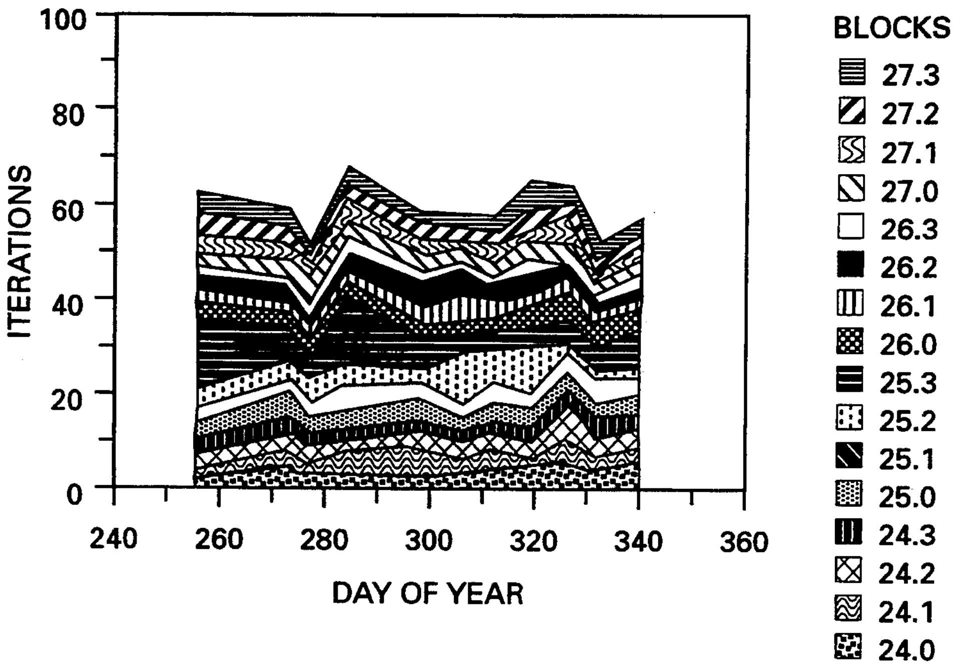
Figure 12D:
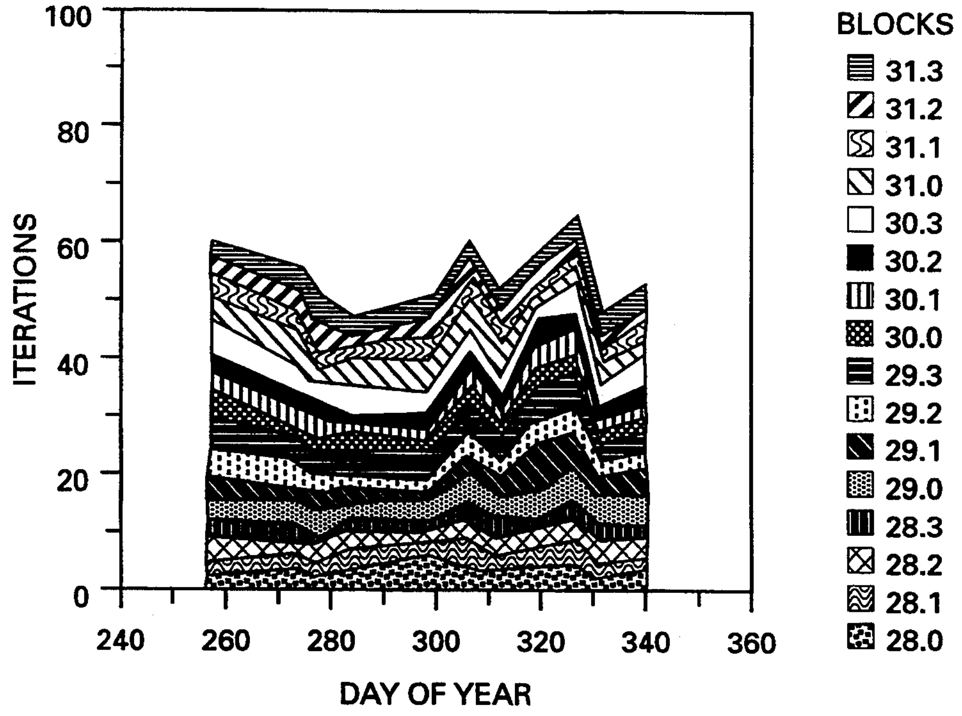

FIG. 8(*a*) is a graph illustrating the behavior pattern of a drifting unstable photomultiplier block (20,0), over a year, plotting the number of iterations required to calibrate the block (20,0) over a year; FIG. 8(*b*) shows the superimposed patterns of the four (4) photomultiplier blocks (20,3), (20,2), (20,1) and (20,0) in detector-photomultiplier bucket 20, plotting the total number of iterations over a year.

FIGS. 9(*a*)–9(*d*) are graphs illustrating the behavior pattern for one year of all 64 photomultiplier blocks of ring No. 1 of a PET scanner, plotting the total number of iterations over a year.

FIGS. 10(*a*)–10(*d*) shows the behavior pattern over a year of all 64 photomultiplier blocks in ring No. 2 of a PET scanner, plotting the total number of iteration over a year.

FIGS. 11(*a*)–11(*d*) show the behavior pattern of ring No. 2 of a PET scanner without using the preventative maintenance system of the present invention, plotting the total number of iterations over time from day 1 through day 245, showing that the width of each trace is irregular over time because of unstable photomultiplier blocks.

FIGS. 12(*a*)–12(*d*) show the behavior pattern of the same ring No. 2 of the scanner described in FIGS. 11(*a*)–11(*d*) while using the preventative maintenance system of the present invention, plotting the total number of iterations over time, from day 256 through day 340, showing that the width of more traces remain thin and constant over time because there are less unstable photomultiplier blocks in the ring.

Figure 13A:
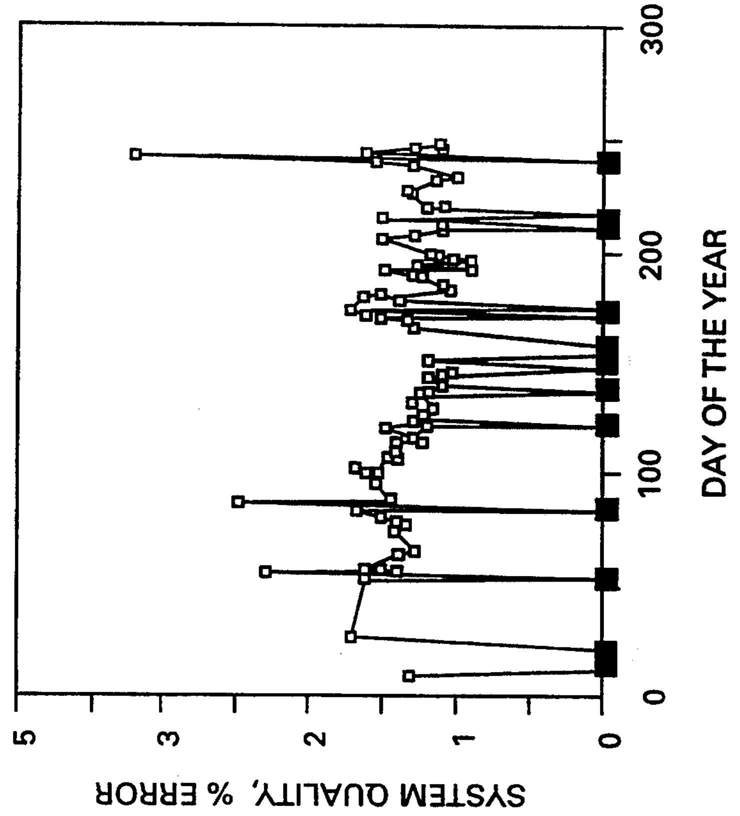
Figure 13B:
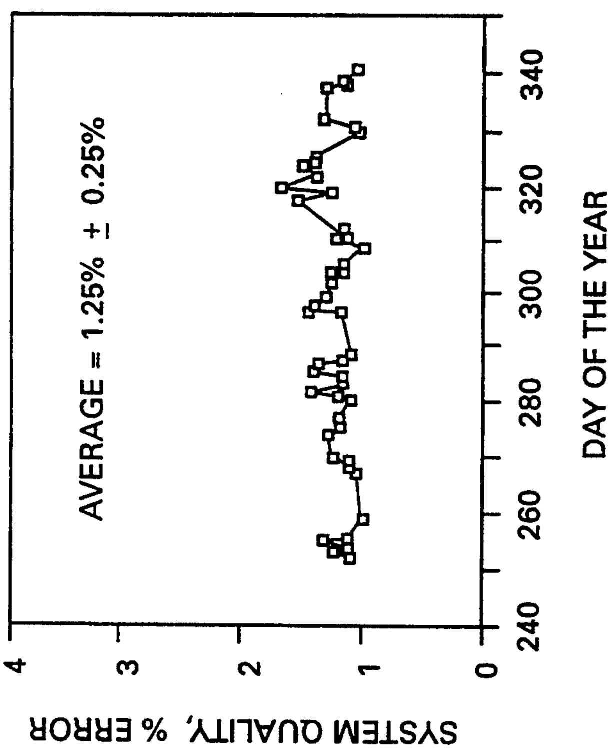

FIG. 13(*a*) is a graph showing the overall PET scanner system error without utilizing the preventive maintenance system of the present invention over the same time period plotted in FIGS. 11(*a*)-11(*d*), the blocked out portions (on the "Day of Year" scale)) indicate that the scanner was inoperative due to unscheduled maintenance caused by photomultiplier failure; FIG. 13(*b*) is a graph showing the overall PET scanner system error while utilizing the preventive maintenance system of the present invention over time period plotted in FIGS. 12(*a*)-12(*d*), the unscheduled downtime of the scanner due to photomultiplier failure was reduced to 0% and the overall system accuracy after normalization is improved to a steady average of 1.25%±0.25%.

DETAILED DESCRIPTION OF THE PREFERRED EMBODIMENTS

Figure 1A:
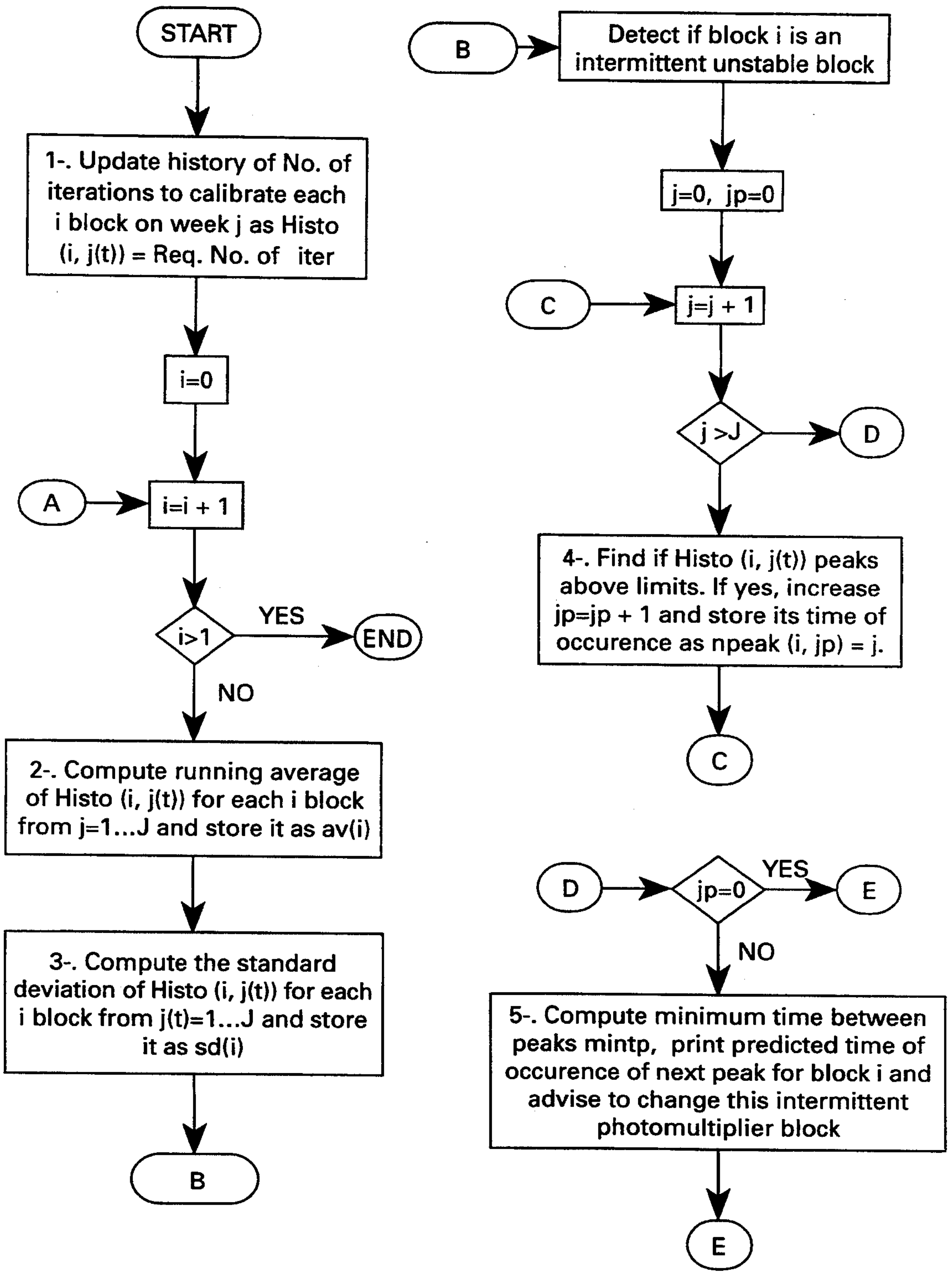
FIGS. 1(*a*) and 1(*b*) are block diagrams of a flow chart illustrating the present invention.
Figure 1B:
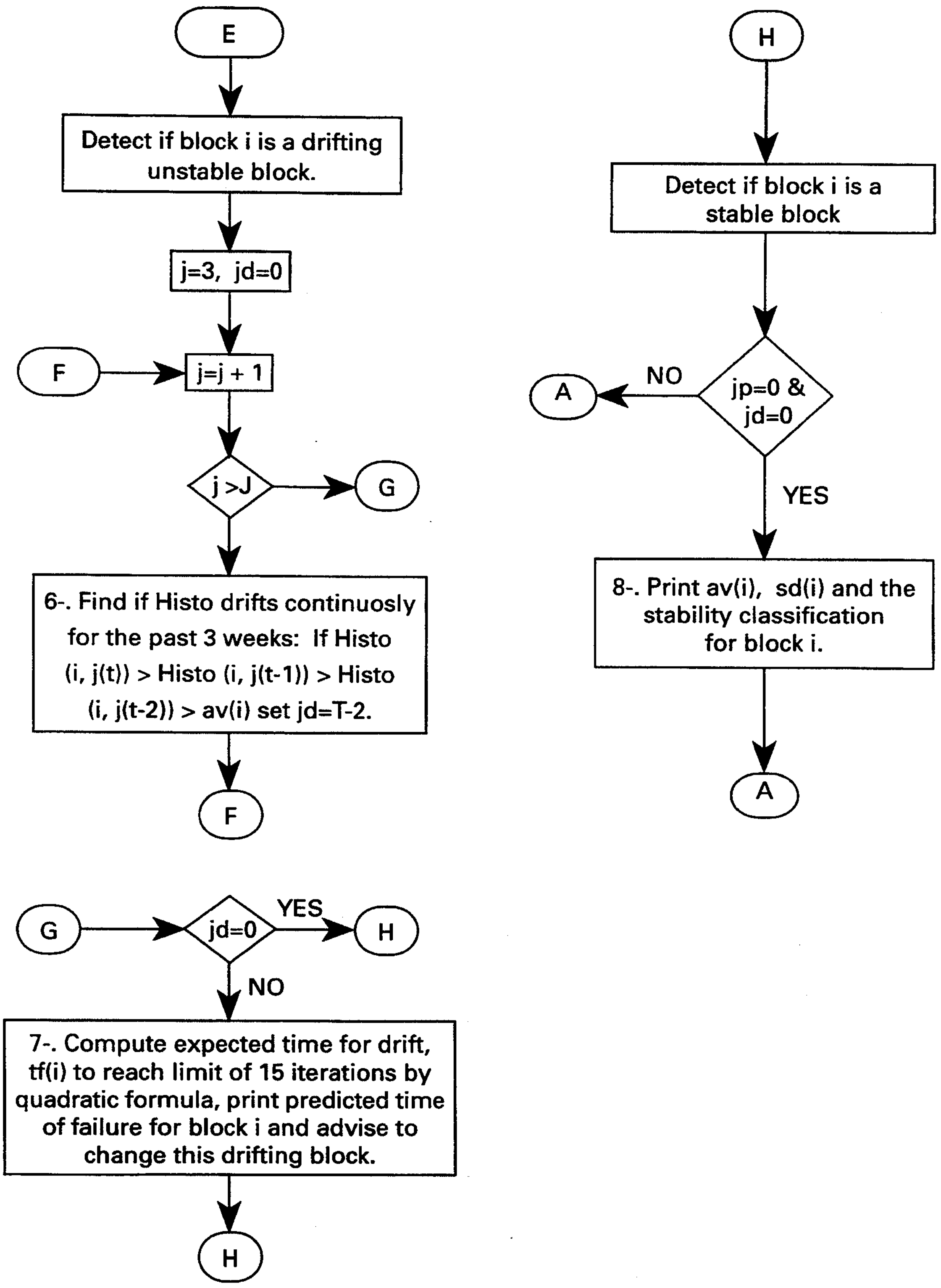
Figure 2A:
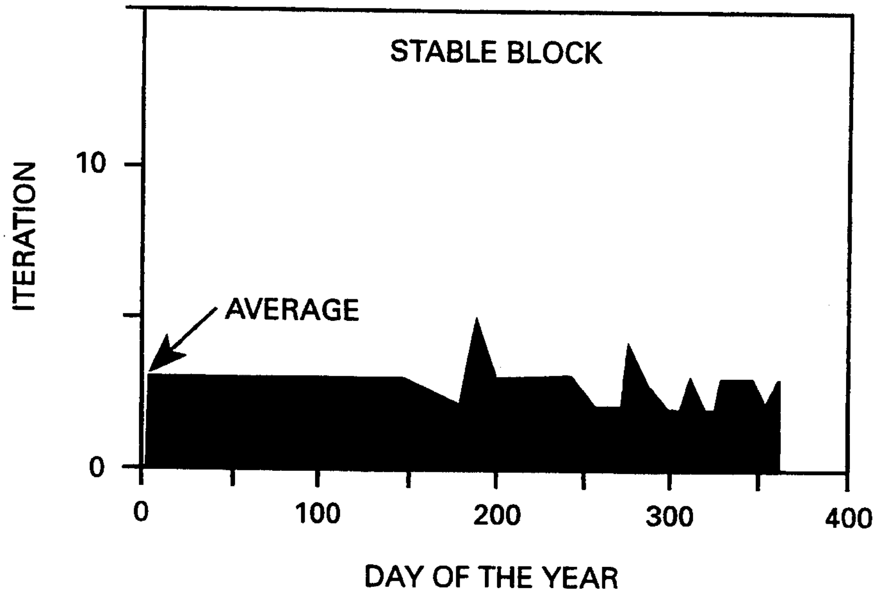
FIG. 2(*a*) is a graph illustrating the behavior pattern of a stable PMT block plotting the number of iterations over one year.
Figure 2B:
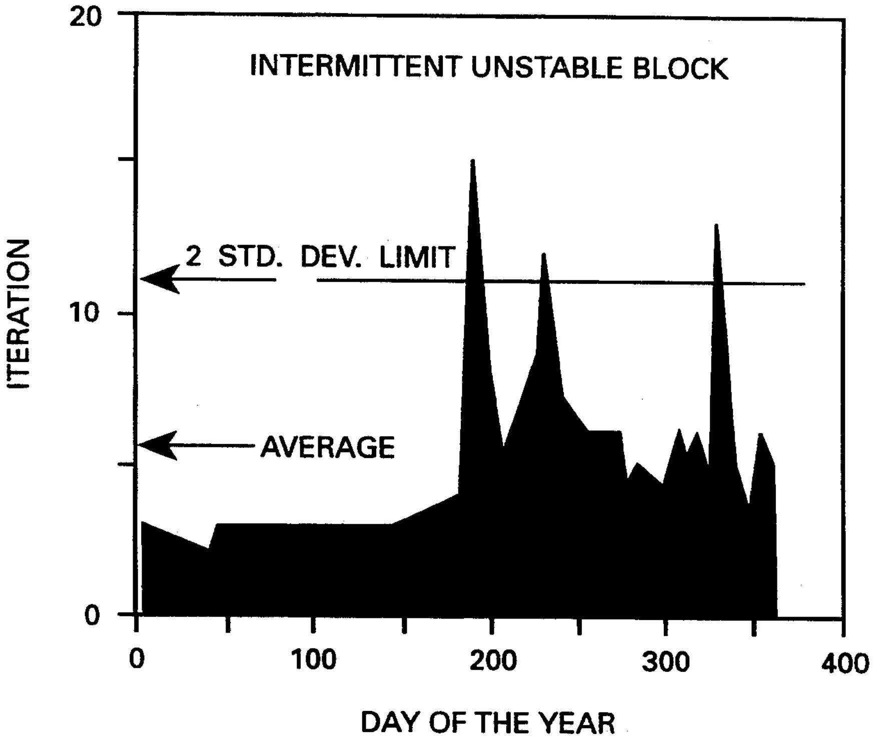
Figure 2C:
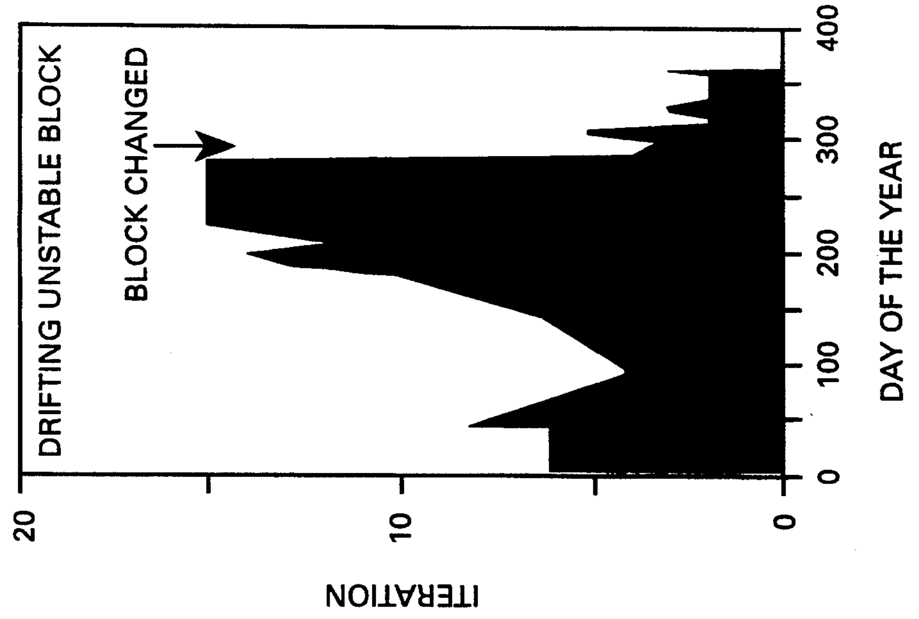
Figure 2D:
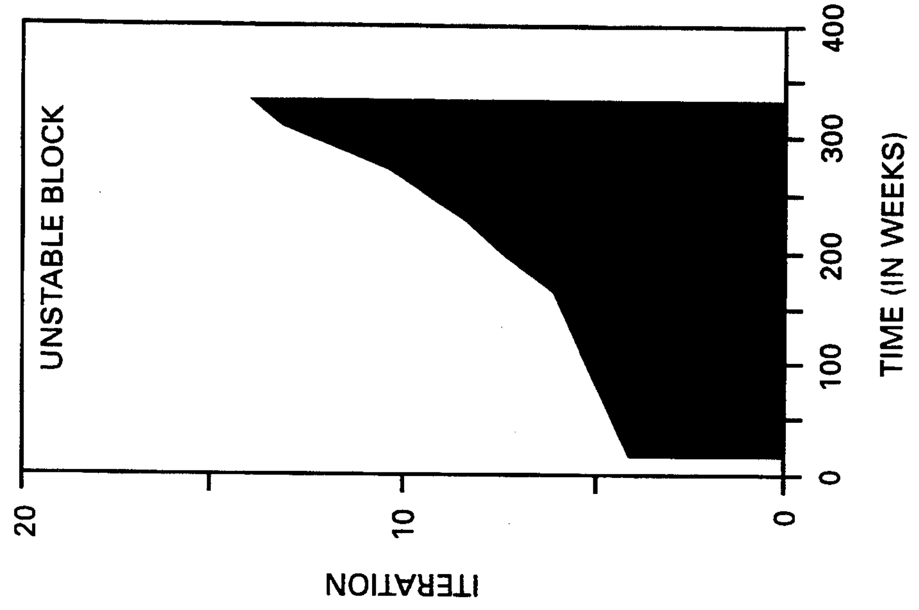

The preferred embodiments of the present invention utilize a series of steps illustrated in the flow chart shown in FIGS. 1(*a*) and 1(*b*). The method can be carried out manually, mechanically or by the use of a computer program installed in the host computer of the PET scanner. The method of the present invention is described in complete detail, sufficient to allow one of ordinary skill in the art to use the present invention either manually or by programming the present preventative maintenance system in any computer language and in any host computer controlling a PET scanner. The specific details of the present invention, including the mathematical formulae, expert system rules and the logical flow chart diagram illustrated in FIGS. 1(*a*) and 1(*b*) are described in more detail below.

The specific PET scanner used at Brookhaven National Laboratory in making the present invention is a CTI-931 model that was manufactured by Siemens. However, the present invention is useful for many other PET scanner models. In a similar fashion to Siemens, each PET manufacturer uses several hundreds of photomultiplier detector blocks in each of their PET scanners.

An iterative computer program is supplied by the manufacturers as a part of the PET scanner's operating system, to adjust the gain of each of the photomultiplier tubes in the PMT detector blocks of the scanner. In some detector blocks, several iterative adjustments must be made to bring the gain of each PMT to an acceptable level, i.e. within 1% of that of the three (3) other PMT's in the block. Once each block has been calibrated to within 1% spread range, the entire detector is normalized using another program which multiplies the efficiency of each detector block by the average iterative adjustment count of the block. For example, in the case of the scanners manufactured by Siemens, see, SIEMENS, "Operating Instructions, Positron Emission Tomography Systems", Publication #98 76 392 Revision A (June, 1989) at Chapter 5.5: Utilities Menu, Section 5.5.3: System Calibration and Normalization, starting on page 5-308.

The entire process is usually carried out once a week in order to calibrate and normalize the PET scanner. The information on the number of iterations required to calibrate each block of PMT's is typically stored in the host computer system which controls the scanner and is routinely printed out in the form shown in Appendix A. Once the number of adjustment iterations required of a PMT detector block has reached a predetermined level, typically about 15 iterations, the detector block is designated to be at the limit of its calibration range and the photomultiplier detector block must be returned to the manufacturer for replacement or servicing.

The program, although used to calibrate the scanner, does not indicate any preventative maintenance requirements. Instead, a byproduct of the calibration program that was completely ignored by the PET scanner manufacturers and users alike, namely the number of iterations needed to calibrate each photomultiplier block, is the starting point for the present invention.

The steps required in carrying out the present invention are as follows:

Step 1—Recording the Iterative Calibration History of the Photomultiplier Detector Blocks of the PET Scanner Step 1—Each time the PET scanner is routinely calibrated, a record is produced of the number of iterative adjustments that were required to balance the gain of the four (4) photomultiplier detectors in each block. The record is stored in the host computer of the PET scanner and is typically printed out and such a printout was used as the source of data for several Figures of the drawing, as explained herein.

Accordingly, in utilizing the present invention, the first step is the creation of a file which can be called Histo(i,j(t)) that stores the calibration history for each photomultiplier detector block throughout the year. The computer aided method for balancing the photomultiplier's gain is provided by the particular manufacturer of the PET scanner, as described above, and is routinely carried out by the PET scanner user.

In file Histo(i,j(t)), i is an integer from 1 through I, denoting the number of the specific photomultiplier detector blocks, where I is the total number of detector blocks in the PET scanner. Also in file Histo(i,j(t)), j is an integer from 1 through J to denote the sequential number of the iterative adjustments required to calibrate the particular photomultiplier detector block i, at a particular time t, in which J denotes the number of the last available iterative adjustment made on the last time t=T. Preferably, if this method is carried out on a weekly basis, both t and T are measured in number of weeks, thus T can vary from 1-52 throughout the year. As shown in the flow chart of FIGS. 1(*a*) and 1(*b*), step 1 is the only step outside of the main loop "A" all the remaining seven (7) steps are executed once for each value of i=1 through I, thus analyzing all the photomultiplier detector blocks in the PET scanner.

If the measurements are done weekly, step 1 requires the updating each week of the file Histo(i,j(t)). If there are 52 weeks in a year and 128 photomultiplier detector blocks, at the end of a year this file will have grown to have a dimension of 52×128 calibration measurements.

Steps 2 and 3—Compute the Average and Standard Deviation of the Number of Iterative Calibrations for a Photomultiplier Detector Block Steps 2 and 3 of this method are used to compute well known statistical properties for each photomultiplier detector block as follows:

Step 2—Using the information stored in the file Histo (i,j(t)), compute the average number of the iterative adjustments required to calibrate photomultiplier detector block i, for the available J number of iterative adjustments over a predetermined time period, t through T, and store this average as a file which can be called av(i).

Step 3—Using the information stored in the file Histo (i,j(t)), compute the standard deviation of the number of iterative adjustments required to calibrate PMT detector block i for the available J number of iterative adjustments over a predetermined period of time, for time t through T, and store this standard deviation as a file which can be called sd(i).

Steps 4 and 5—Detecting an Intermittently Unstable Photomultiplier Block

Steps 4 and 5 use the Inventors' observations and analysis of the behavior of the photomultiplier blocks which are summarized in a set of expert system rules to predict if the "ith" photomultiplier detector block is intermittently unstable and if so, indicate the need for its replacement. The number of intermittent peaks detected for each photomultiplier can be denoted by jp. If no intermittent peaks are detected then jp retains its initial value, jp=0.

Step 4—Verify the following Expert rules:

Expert rule (a); if Histo(i,j(t))>av(i)+2sd(i) then the "ith" photomultiplier detector block is intermittently unstable, with a "peak" of instability at time t=T. The time T of occurrence of the peak is stored in a file which can be called npeak(i,jp)=T.

Expert rule (b); if Expert rule (a) is true, and also if Histo(i,j(t))=a value designated as the limit of the PET scanner's iterative calibration range, which for the CTI 931 PET scanner is greater than or equal to 15, then the "ith" photomultiplier detector block is not only intermittently unstable, but is also at the limit of its calibration range. Store the time t=T of the intermittently unstable detector block i reaching its calibration limit in a file which can be called npeak(i,jp)=T.

Step 5—Using the information in the file npeak(i,jp), compute the average time, avtp, the minimum, mintp, and the maximum time between peaks, maxtp. If Expert rule (a) is true, provide an output or indication, for example, by displaying or printing the information that the "ith" PMT detector block is an intermittently unstable block, with the parameters avtp, mintp and maxtp. Also, provide the output or indication, for example, by printing or displaying an advise to change this block before the next peak of instability might occur at time=(T+mintp). If Expert rule (b) is also true, provide an output or indication, for example, by printing or displaying the additional advise to urgently change this block as soon as possible to avoid system failure.

Steps 6 and 7—Detecting a Drifting Unstable Photomultiplier Block

Steps 6 and 7 use the Inventor's observations and analysis of the behavior of the photomultiplier blocks which are summarized in a set of expert system rules to detect if the "ith" photomultiplier detector block is a drifting unstable block and if so, indicate the need for its replacement, and predict its probable time to failure. The particular time t when the drifting started for each photomultiplier block can be denoted by the value jd=T−2. If no drift is detected than jd retains its initial value, jd=0.

Step 6—Verify the following Expert rules:

Expert rule (c); if Histo(i,J(T))>Histo(i,j(T−1))->Histo(i,j(T−2))>av(i) then the "ith" photomultiplier detector block is a drifting unstable block. The time of initial drift can be stored as jd=T−2.

Expert rule (d); if Expert rule (c) is true and also Histo(i,J(T))=a value designated as the limit of the PET scanner's iterative calibration range, which for the CTI 931 PET scanner is 15, then the "ith" photomultiplier detector block is not only a drifting unstable block, but also at the limit of the iterative calibration range of the PET Scanner.

Expert rule (e); if Expert rule (c) is true and Expert rule (d) is false, then the preventative maintenance method of the present invention will predict for the "ith" block the time of failure which can be designated as tf(i), when Histo(i,j(tf(i)) will reach the limit of the calibration range of the PET scanner, for example, 15 iterations. The value is given by a quadratic fit to the values of Histo(i,j(t)) for the past three (3) times the PET scanner has been calibrated, for Example, over the past 3 weeks if the PET scanner is calibrated weekly. Then, solving the quadratic equation for the value of tf(i) corresponding to the limit of the calibration range;

the corresponding formula is given by the well known expression:

$$tf(i)=[-B+\{BB-4A(C-15)\}exp0.5]/2A$$

where

A=0.5[Histo(i,j(T−2))−2 Histo(i,j(T−1))+Histo(i,J(T))]

B=−0.5[3 Histo(i,j(T−2))−4 Histo(i,j(T−1))-+Histo(i,J(T))]

C=Histo(i,j(T−2))

Step 7—If Expert rule (c) is true then provide an output or indication, for Example, printing or displaying the information that the "ith" detector block is a drifting unstable block which started to drift at time jd=T−2. If Expert rule (d) is also true, provide the additional information that the "ith" detector block started to drift at time jd=T−2 with a drift rate faster than a quadratic drift, and provide the advise to urgently change this block as soon as possible, since it has reached the limit of the calibration range for the PET scanner. If Expert rule (e) is true provide the additional information, that the "ith" detector block will probably reach the limit of the calibration range for the PET scanner, and should be changed before it fails at time=(T−2)+tf(i).

Step 8—Detecting a Stable Photomultiplier Block With High Stability, Medium Stability or Marginal Stability Step 8 uses the expert rules to determine if the "ith" detector block is a stable photomultiplier block and quantifies its degree of stability.

Step 8—Verify the following Expert rules:

Expert rule (f); if at time t=T, jp=0, jd=0 and av(i)<3, then provide an output or indication, for example, by printing or displaying the information, that at time t=T the "ith" detector block is a stable detector block with a high stability, an average av(i) and a standard deviation sd(i).

Expert rule (g); if at time t=T, jp=0, jd=0 and 3≦av(i)<5, then provide an output or indication, for example, by printing or displaying the information, that at time t=T the "ith" detector block is a stable detector block with a medium stability, an average av(i) and a standard deviation sd(i).

Expert rule (h); if at time t=T, jp=0, jd=0 and av(i)≧5, then provide an output or indication, for example, by printing or displaying the information, that at time t=T the "ith" detector block is a stable detector block with a marginal stability, an average av(i) and standard deviation sd(i).

After step 8 is performed, the process is repeated, for example, referring to FIG. 1(*a*) by repeating the main loop "A" of the flow chart, incrementally increasing the value of i by one until all of the "I" photomultiplier detector blocks have been analyzed. When the counter i reached the limit I the preventive maintenance program ends for time t=T.

THE SYSTEM APPARATUS ACCORDING TO THE PRESENT INVENTION

The system apparatus utilized for carrying out the present invention preferably includes the host computer of a PET scanner oriented with a software program or a combination of ROM and RAM devices. The apparatus of the present invention can also be embodied in an independent testing device which can be connected to the host computer of a PET scanner to carry out the method of the present invention.

Accordingly, the present invention provides an apparatus for the preventative maintenance of photomultiplier detector blocks. Preferably, the apparatus includes in the host computer a memory adapted for storing:

(1) a record of a number of iterative adjustments that are necessary to calibrate the gain of a photomultiplier detector block i at a time $t_0$, a time $t_1$ and a time T, where $T>t_1>t_0$, which is designated as Histo(i,j(t));

(2) an average value designated av(i), and a standard deviation value designated sd(i).

The processor of the host computer is also configured, preferably by means of a software program or a combination of RAM and ROM devices to perform the following calculations and operations:

(1) compute the average number of iterative adjustments necessary to calibrate said detector block for said time $t_0$ through said time T, and store the average value through time T in memory;

(2) compute the standard deviation of the number of iterative adjustments necessary to calibrate the detector block for time $t_0$ through time T, and store the standard deviation value through time T in memory;

(3) compute at time T if the following conditions are satisfied:

Histo(i,j(T))>av(i)+2sd(i) to determine whether the detector block i is an intermittent unstable block;

(4) compute at time T if the following conditions are satisfied:

Histo(i,J(T))>Histo(i,j(T−1))>Histo(i,j(T−2))>av(i); to determine whether the detector block i is a drifting unstable block;

(5) determine that the photomultiplier block i is a stable detector block if the detector block i is not an intermittent unstable detector block and is not a drifting unstable detector block;

(6) compute if the number of iterative adjustments required to calibrate the photomultiplier detector block at time T is greater than or equal to a predetermined number, which in the case of the CTI-931 PET scanner is 15, designating the photomultiplier detector block limit of calibration range, to determine whether the photomultiplier detector block i is at its calibration range limit and should be replaced or serviced.

If the processor of the host computer determines that detector block i is an intermittent unstable block with a peak at time T, the following values are stored in the memory:

(3) the number of iterative adjustments required for detector block i at time T as npeak(i,jp)=T, in which jp denotes the number of intermittent peaks detected for photomultiplier detector block i from time $t=t_0$ through t=T.

The processor of the host computer is preferably also configured to:

(4) calculate the average time designated avtp, the minimum time designated mintp, and the maximum time designated maxtp, between peaks of the intermittently unstabled block from time $t_0$ to time T; and (5) generate an output signal, preferably causing the host computer to print or display an advise to change photomultiplier detector block i prior to the time when a new peak may occur at a time=T+mintp.

In addition, the processor of the host computer is also configured to:

(6) compute if the number of iterative adjustments required to calibrate the photomultiplier detector block at time T is greater than or equal to a predetermined number designating the photomultiplier detector block limit of calibration range, preferably 15 as described above, to determine whether the photomultiplier detector block i is at its calibration range limit and should be replaced or serviced; and (7) generate an output signal, preferably causing the host computer to print or display the advise to urgently change photomultiplier detector block i as soon as possible to avoid detector block failure.

If the processing system determines that the detector block is a drifting unstable block at time T, then the processing system is further configured to:

(6) compute the number of iterative adjustments required to calibrate the photomultiplier detector block at time T is greater than or equal to a predetermined number designating the photomultiplier detector block limit of calibration range, preferably 15 as described above, to determine whether the photomultiplier detector block i is at its calibration range limit and should be replaced or serviced.

Alternatively, if the processing system determines that the detector block i is a drifting unstable block at time T, and the number of iterations is less than the predetermined number designating the photomultiplier detector block limit of calibration range, preferably 15 as described above, then the processing system is further configured to:

(8) compute a time of failure of detector block i, designated tf(i), when detector block i will reach its predetermined calibration range limit of iterative adjustments, preferably 15 as described above, designated Histo(i,j (tf(i))) by satisfying the equation:

$$tf(i)=[-B+\{BB-4A(C-Z)\}exp0.5]/2A$$

in which,

A=0.5[Histo(i,j(T−2))−2 Histo(i,j(T−1))+Histo(i,J(T))],

B=−0.5[3 Histo(i,j(T−2))−4 Histo(i,j(T−1))+Histo(i,J(T))],

C=Histo(i,j(T−2)), and

Z=the predetermined calibration range limit of iterative adjustments, preferably 15 as described above, and causing the value for tf(i) to be stored in memory;

(9) generate an output signal, preferably causing the host computer to print or display an advise that photomultiplier detector block i is a drifting unstable block i at time T, and probably will reach the limit of its calibration range at a time=(T−2)+tf(i).

Alternatively, if the processor determines that block i has reached its calibration limit the processor is further configured to:

(10) generate an output signal, preferably by causing the host computer to print or display an advise that photomultiplier detector block i is a drifting unstable block at time T, and to change or service said block i as soon as possible to avoid photomultiplier block failure, since it has reached the limit of its calibration range.

If the processing system determines that detector block i is a stable detector block at time T, the processor is further configured to:

(6) compute if the value of Hist(i,J(T)) is greater than or equal to a predetermined number, preferably 15 as described above, designating the photomultiplier detector block limit of calibration range to determine if detector block i has reached its calibration range limit and should be replaced or serviced.

If the processing system determines that the detector block i is a stable detector block and has not reached its calibration range limit at time T, the processor is further configured to:

(1) compute if the value of av(i) is less than a first predetermined value, preferably 3 in the case of the photomultiplier detector blocks utilized in the CTI-931 PET scanner, to determine that detector block i has a high degree of stability;

(2) compute if the value of av(i) is greater than or equal to said first predetermined value, preferably 3 as described above, and less than a second predetermined value, preferably 5 in the case of the photomultiplier detector blocks utilized in the CTI-931 PET scanner, to determine that detector block i has a medium degree of stability; and (3) compute if the value of av(i) is greater than or equal to the second predetermined value, preferably 5 as described above, to determine that detector block i has a marginal degree of stability;

(4) store in memory that detector block i at time T is a stable detector block with either a high degree of stability, a medium degree of stability, or a marginal degree of stability;

(5) generate an output signal, preferably causing the host computer to print or display an advise that at time t=T photomultiplier detector block i is a stable detector block and that photomultiplier detector block i has the particular av(i), sd(i) and the particular degree of stability as calculated above.

If the processor determines that photomultiplier detector block i is stable, but has reached its calibration range limit, preferably 15 as described above, then the processor is configured to:

(7) generate an output signal, preferably causing the host computer to print or display an advise that at time T photomultiplier detector block i is a stable detector block, and has reached its calibration range limit and should be replaced as soon as possible to avoid photomultiplier detector block failure in the system.

The preventive maintenance system of the present invention preferably is designed to analyze all of the photomultiplier detector blocks of a PET scanner. Accordingly, the processor preferably includes a counter for analyzing each photomultiplier detector block i=1 through I of a PET scanner, in which I is a total number of photomultiplier detector blocks of the PET scanner to be calibrated. In carrying out the method of the present invention the PET scanner is periodically calibrated, preferably once a week. Therefore, the processor is configured to actuate the memory in order to store each of the values generated from time $t=t_0$ through T, and to periodically update each of the values generated as described above for the PET scanner.

As understood by those skilled in the art, the present invention may be utilized for preventive maintenance and testing of a PET scanner, or it may be adapted to test one or more photomultiplier detector blocks in other orientations in the various combinations described above. Thus, while the inventors have described what are presently the preferred embodiments of this invention, other changes and modifications could be made by those skilled in the art without departing from the scope of the invention, and it is intended by the inventors to claim all such changes and modifications.

EXAMPLE

A typical printout for a PET scanner's computer operating system, for example such as printed by a Siemens,Computer Imaging Technologies (CTI) PET-931 scanner used in carrying out and illustrating the present invention, shows the iterative gain adjustments to the PMT detector blocks of the PET scanner, Accordingly, information is provided which is utilized in accordance with the present invention for determining the existence of each of the three types of photomultiplier detector blocks; stable, drifting unstable, and intermittently unstable. This information is routinely produced as the PET scanner is calibrated and is readily available to the user.

For example, in the PET scanner utilized in preparing and illustrating the present invention, the Siemens, Computer Imaging Technologies (CTI) PET-931 scanner, the printout contains the identification of each photomultiplier in the first two columns, given as the "bucket No. and block No." The bucket number varies from 0 to 35 and each bucket has four blocks, numbers 0 to 3. In this example photomultiplier detector block (0,3) was chosen to illustrate an intermittent unstable block, block (20,0) was chosen to illustrate the behavior of a drifting unstable block, and blocks (15,0), (15,1) and (15,2) were chosen as examples of stable photomultiplier detector blocks. Blocks (15,0), and (15,2) illustrate stable photomultiplier detector blocks having a medium degree of stability (3 iterations), and block (15,1) having a marginal degree of stability (6 iterations).

The CTI-931 PET detector-photomultiplier bucket system circumferentially arranged about the gantry is illustrated in FIG. 4(*a*). Inside each photomultiplier detector block, illustrated in FIG. 4(*b*), there are four photomultiplier detector tubes, these are illustrated in FIG. 4(*c*). Accordingly, the next four columns in the typical printout list the gain of each of the four photomultipliers that are contained in each block. Depending on the particular gain value, each photomultiplier reports a certain number of detected pulses called counts. These are typically shown in the next four columns.

The purpose of the calibration is to bring these counts to within 1% of the block average count value. The next column (11th column), reports this % error. By observing how this % error decreases, the number of iterative adjustments to bring all four (4) photomultipliers of the block within the calibration tolerance of 1% can be counted and stored in the host computer memory. Once the desired calibration tolerance of 1% is achieved for the four photomultipliers of the block, the message "DONE" is printed.

In the particular examples illustrated, stable photomultiplier detector block (15,0) took 3 iterations to be properly calibrated; intermittent unstable block (0,3) reached the scanner's limit of 15 iterations and still registered a residual calibration error of 15%, thus the message "FAILED" was printed on day No. 207. Likewise, drifting unstable photomultiplier detector block (20,0) also reached the scanner's limit of 15 iterations on day No. 228 with a residual error of 61% and therefore the message "FAILED" was printed.

In carrying out the method of the present invention, the number of iterations required to calibrate a photomultiplier detector block i are stored in a host computer memory as Histo(i,j(t)), where the index i denotes the sequentially numbered photomultiplier detector block, and j(t) indicates the number of iterative adjustments on a particular measurement date (expressed as the number of the week in the year). The numbers stored in the memory array Histo(i,j(t)) constitute the input data utilized in the present invention. To help visualize the patterns that identify each type of photomultiplier instability, these numbers are displayed in graphic form as illustrated in the various figures.

Specifically referring to the drawings, FIG. 2(*a*) is a graph illustrating the behavior pattern of a stable PMT block plotting the number of iterations over one year. The average number of iterations is indicated with the arrow. FIG. 2(*b*) is a graph illustrating the behavior pattern of an intermittent unstable PMT block plotting the number of iterations over the same year as in FIG. 2(*a*). The average number of iterations and the two standard deviation limit of iterations are shown with the arrows. FIG. 2(*c*) is a graph illustrating the behavior pattern of a drifting unstable PMT block plotting the number of iterations over the same year as in FIG. 2(*a*). The date on which the block was changed is shown with the arrow. FIG. 2(*d*) is a graph illustrating the main drift pattern of an unstable PMT block plotting the number of iterations over time (in weeks).

Figure 3:
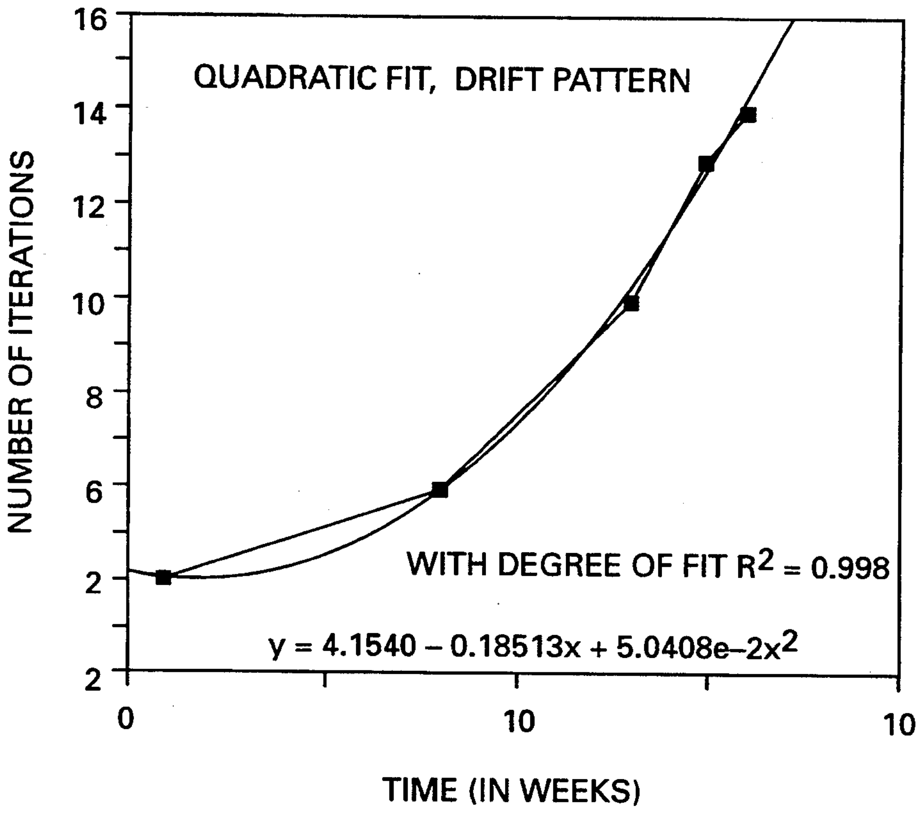

FIG. 3 provides a graph plotting the quadratic fit to the main drift pattern illustrated in FIG. 2(*d*), in which the number of iterations are plotted on the Y axis and time (in weeks) is plotted on the X axis, wherein:

$$Y=4.1540-0.18513X+5.0408e-2X^2,$$

with a degree of fit $R^2=0.998$.

The performance of intermittent unstable PMT block (0,3) is illustrated in FIG. 5 plotting the % error of block (0,3) versus the number of iterative gain adjustments required on the particular day to calibrate the gain of the four (4) PMTs in the block. FIG. 5(*a*) shows behavior of the block on day #95. FIG. 5(*b*) shows the behavior of the block on day #181. FIG. 5(*c*) shows the behavior of the block on day #191 when block (0,3) reached the limit of its calibration range and failed. FIG. 5(*d*) shows graphs (a), (b), and (c) superimposed with day #145, showing the number of iterative gain adjustments required to equalize accounts of the four (4) photomultipliers in block (0,3) from day to day.

The performance of a drifting unstable PMT detector block (20,0) is illustrated in FIG. 6. Specifically, these graphs plot the percent error of block (20,0) versus the number of iterative gain adjustments required on a particular date to calibrate the gain of the four (4) PMTs in the block. FIG. 6(*a*) shows the behavior of the block on day #95. FIG. 6(*b*) shows the behavior of the block on day #181. FIG. 6(*c*) shows the behavior of the block on day #200. FIG. 6(*d*) shows graphs (a), (b), (c) as superimposed with day #'s 191, 228 and 242 after block (20,0) failed.

The behavior pattern of the photomultiplier detector blocks described above over a year (1991) is illustrated in FIG. 7. Specifically, FIG. 7(*a*) is a graph illustrating the behavior pattern of an intermittent unstable photomultiplier block (0,3) plotting the number of iterations required to calibrate the block over a year. FIG. 7(*b*) shows the superimposed patterns of the four (4) photomultiplier blocks (0,3), (0,2), (0,1), and (0,0), in detector-photomultiplier bucket 0, plotting the total number of iterations over a year.

The behavior pattern of a drifting unstable photomultiplier block (20,0), over a year, is shown in FIG. 8(*a*) as a graph plotting the number of iterations required to calibrate the block (20,0) over a year. FIG. 8(*b*) shows the superimposed patterns of the four (4) photomultiplier blocks (20,3), (20,2), (20,1) and (20,0) in detector-photomultiplier bucket 20, plotting the total number of iterations over a year.

The behavior pattern for one year of all 64 photomultiplier blocks of ring No. 1 of a PET scanner is shown in FIGS. 9(*a*)–9(*d*) as graphs plotting the total number of iterations over a year. The behavior pattern over a year of all 64 photomultiplier blocks in ring No. 2 of a PET scanner is shown in FIGS. 10(*a*)–10(*d*) as a graph plotting the total number of iteration over a year.

The behavior pattern of ring No. 2 of a PET scanner, without using the preventative maintenance system of the present invention, is shown in FIGS. 11(*a*)–11(*d*) as graphs plotting the total number of iterations over time from day 1 through day 245, showing that the width of each trace is irregular over time because of unstable photomultiplier blocks.

By contrast, the behavior pattern of the same ring No. 2 of the PET scanner, as described in FIGS. 11(*a*)–11(*d*) while using the preventative maintenance system of the present invention, is shown in FIGS. 12(*a*)–12(*d*) as graphs plotting the total number of iterations over time, from day 256 through day 340, showing that the width of more traces remain thin and constant over time because there are less unstable photomultiplier blocks in the ring.

The overall PET scanner system error, without utilizing the preventive maintenance system of the present invention over the same time period plotted in FIGS. 11(*a*)–11(*d*), is shown in FIG. 13(*a*), the blocked out portions (on the "day" scale) indicate that the scanner was inoperative due to unscheduled maintenance caused by photomultiplier failure. By contrast, FIG. 13(*b*) is a graph showing the overall PET scanner system error, while utilizing the preventive maintenance system of the present invention over time period plotted in FIGS. 12(*a*)–12(*d*), the unscheduled downtime of the scanner due to photomultiplier failure was reduced to 0% and the overall system accuracy after normalization is improved to a steady average of 1.25%±0.25%.

We claim:

1. A computer implemented method for the preventive maintenance of photomultiplier detector blocks of a PET scanner, to determine if a detector block is intermittently unstable, the method comprising the steps of:

(a) calibrating a photomultiplier detector block i of a PET scanner by iteratively adjusting a gain by which photomultipliers in said photomultiplier detector block i amplify a detected signal, and storing a record of a number of iterative adjustments that are necessary at time $t_0$ to calibrate the photomultiplier detector block i, wherein said record is designated as Histo(i),j(t));

(b) repeating step (a) for a time $t_1$ and for a time T, where $T > t_1 > t_0$;

(c) computing an average of the number of iterative adjustments necessary to calibrate said detector block for said time $t_0$ through said time T, wherein said average through said time T is stored as av(i);

(d) computing a standard deviation of the number of iterative adjustments necessary to calibrate said detector block for said time $t_0$ through said time T, wherein said standard deviation through said time T is stored as sd(i);

(e) determining whether said photomultiplier detector block i is an intermittent unstable block with a peak at said time T, by computing at said time T if: $\mathrm{Histo}(i,j(T)) > av(i) + 2sd(i)$, wherein if it is determined that said detector block is an intermittent unstable block with a peak at said time T, said method further comprising:

(1) storing said number of iterative adjustments required for said detector block i at said time T as npeak(i,jp)=T, wherein jp denotes the number of intermittent peaks detected for said photomultiplier detector block i from time $t = t_0$ through $t = T$;

(2) calculating a minimum time designated mintp, between peaks of said intermittent unstable block from said times $t_0$ to said time T; and (3) providing an output signal to advise that photomultiplier detector block i is an intermittently unstable block and should be changed or serviced prior to a time=T+mintp when a new peak is likely to occur.

2. A method according to claim 1, further comprising:

(4) determining whether the photomultiplier detector block i is at its calibration range limit and should be replaced or serviced by computing if said number of iterative adjustments required to calibrate said photomultiplier detector block at said time T is greater than or equal to a predetermined number designating the photomultiplier detector block limit of calibration range; and wherein if it is determined that said photomultiplier detector block i is at its calibration range limit, said method further comprises:

(5) providing an output signal advising to urgently change or service photomultiplier detector block i as soon as possible to avoid detector block failure.

3. A method as recited in claim 2, wherein said predetermined number designating the photomultiplier detector block limit of calibration range is 15.

4. A method according to claim 2, further comprising repeating said steps for each photomultiplier detector block i=1 through I of said PET scanner being calibrated.

5. A method according to claim 1, further comprising repeating said steps for each photomultiplier detector block i=1 through I of said PET scanner being calibrated.

6. A computer implemented method for the preventative maintenance of photomultiplier detector blocks of a PET scanner, to determine if a photomultiplier detector block is a drifting unstable block, the method comprising the steps of:

(a) calibrating a photomultiplier detector block i of a PET scanner by iteratively adjusting a gain by which photomultipliers in said photomultiplier detector block i amplify a detected signal, and storing a record of a number of iterative adjustments that are necessary at a time $t_0$ to calibrate the gain of a photomultiplier detector block i, wherein said record is designated as Histo(i,j(t));

(b) repeating step (a) for a time $t_1$ and for a time T, where $T > t_1 > t_0$;

(c) computing an average of the number of iterative adjustments necessary to calibrate said detector block for said time $t_0$ through said time T, wherein said average through said time T is stored as av(i);

(d) computing a standard deviation of the number of iterative adjustments necessary to calibrate said detector block for said time $t_0$ through said time T, wherein said standard deviation through said time T is stored as sd(i); and (e) determining whether said detector block i is a drifting unstable block at said time T if: $\mathrm{Histo}(i,J(T)) > \mathrm{Histo}(i,j(T-1)) > \mathrm{Histo}(i,j(T-2)) > av(i)$;

wherein if said detector block is a drifting unstable block at said time T, said method further comprises:

(e1) determining whether the photomultiplier detector block i is at its calibration range limit and should be replaced or serviced by computing if said number of iterative adjustments required to calibrate said photomultiplier detector block at said time T is greater than or equal to a predetermined number designating the photomultiplier detector block limit of calibration range; and wherein if it is determined that said photomultiplier detector block i is at its calibration range limit, said method further comprises:

(e2) providing an output signal advising that photomultiplier detector block i is a drifting unstable block at time T, and to change or service said block i as soon as possible to avoid photomultiplier block failure, since said block i has reached the limit of its calibration range.

7. A method according to claim 6, wherein if it is determined that said detector block is a drifting unstable block at said time T, and said number of iterations is less than said predetermined number designating the photomultiplier detector block limit of calibration range, said method further comprises:

(f) predicting a time of failure of detector block i, designated tf(i), when said detector block i will reach said predetermined calibration range limit of iterative adjustments designated Histo(i,j(tf(i))) by satisfying the equation:

$$tf(i) = [-i\ B + \{BB - 4A(C-Z)\}exp0.5]/2A$$

wherein

A=0.5[Histo(i,j(T−2))−2 Histo(i,j(T−1))+Histo(i,J(T))],

B=−0.5[3 Histo(i,j(T−2))−4 Histo(i,j(T−1))+Histo(i,J(T))],

C=Histo(i,j(T−2)), and

Z=said predetermined number designating the detector block i calibration range limit of iterative adjustments, and (f1) providing an output signal advising that photomultiplier detector block i is a drifting unstable block at time T, that it is likely to reach the limit of its calibration range at a time=(T−2)+tf(i), and that it should be changed or serviced prior to reaching its calibration range limit.

8. A method as recited in claim 7, wherein said predetermined number designating the photomultiplier detector block limit of calibration range is 15.

9. A method as recited in claim 7, further comprising repeating said steps for each photomultiplier detector block i=1 through I of said PET scanner, wherein I is the total number of photomultiplier detector blocks of the PET scanner being calibrated.

10. A method as recited in claim 6, further comprising repeating said steps for each photomultiplier detector block i=1 through I of said PET scanner, wherein I is the total number of photomultiplier detector blocks of the PET scanner being calibrated.

11. A computer implemented method for the preventive maintenance of photomultiplier detector blocks of a PET scanner, the method comprising the steps of:

(a) calibrating a photomultiplier detector block i of a PET scanner by iteratively adjusting a gain by which photomultipliers in said photomultiplier detector block i amplify a detected signal, and storing a record of a number of iterative adjustments that are necessary at a time $t_0$ to calibrate the gain of a photomultiplier detector block i wherein said record is designated as Histo(i,j(t));

(b) repeating step (a) for a time $t_1$ and for a time T, where $T>t_1>t_0$;

(c) computing an average number of iterative adjustments necessary to calibrate said detector block for said time $t_0$ through said time T, wherein said average through said time T is stored as av(i);

(d) computing a standard deviation of the number of iterative adjustments necessary to calibrate said detector block for said time $t_0$ through said time T, wherein said standard deviation through said time T is stored as sd(i);

(e) determining whether said photomultiplier detector block i is an intermittent unstable block with a peak at said time T, by computing at said time T if: Histo(i,j(T))>av(i)+2sd(i);

(f) determining whether said photomultiplier detector block i is a drifting unstable block at said time T if: Histo(i,J(T))>Histo(i,j(T−1))>Histo(i,j(T−2))>av(i); and (g) determining that said photomultiplier block i is a stable detector block if said detector block i is not an intermittent unstable detector block as defined in step (e), and said detector block i is not a drifting unstable detector block as defined in step (f);

wherein if it is determined that said detector block is an intermittent unstable block with a peak at said time T, said method further comprising:

(g1) storing said number of iterative adjustments J required for said detector block i at said time T as npeak(i,jp)=T, wherein jp denotes the number of intermittent peaks detected for said photomultiplier detector block i from time $t=t_0$ through $t=T$;

(g2) calculating an average time designated avtp, and a minimum time designated mintp, between peaks of said intermittently unstable block from said time $t_0$ to said time T; and (g3) providing an output signal to advise that photomultiplier detector block i is an intermittent unstable block and should be changed or serviced prior to a time=T+mintp when a new peak is likely to occur;

wherein if it is determined that said detector block is a drifting unstable block at said time T, said method further comprises:

(1) determining whether the photomultiplier detector block i is at its calibration range limit and should be replaced or serviced by computing if said number of iterative adjustments required to calibrate said photomultiplier detector block at said time T is greater than or equal to a predetermined number designating the photomultiplier detector block limit of calibration range; and wherein if it is determined that said drifting unstable photomultiplier detector block i is at its calibration range limit, said method further comprises:

(2) providing an output signal advising that photomultiplier detector block i is a drifting unstable block at time T, and to change or service said blocks i as soon as possible to avoid photomultiplier block failure, since it has reached the limit of its calibration range;

wherein if it is determined that said detector block is a drifting unstable block at time T and said number of iterations is less than said predetermined number designating the photomultiplier detector block limit of calibration range, said method further comprising:

(h) predicting a time of failure of detector block i, designated tf(i), when said detector block i will reach said predetermined calibration range limit of iterative adjustments designated Histo(i,j(tf(i))) by satisfying the equation:

$$tf(i)=[-B+\{BB-4A(C-Z)\}exp0.5]/2A$$

wherein

A=0.5[Histo(i,j(T−2))−2 Histo(i,j(T−1))+Histo(i,J(T))],

B=−0.5[3 Histo(i,j(T−2))−4 Histo(i,j(T−1))+Histo(i,J(T))],

C=Histo(i,j(T−2)), and

Z=said predetermined number designating the detector block i calibration range limit of iterative adjustments; and (i) providing an output signal advising that photomultiplier detector block i is a drifting unstable block i at time T, that it is likely to reach the limit of its calibration range at a time=T−2 (tfi) and that it should be replaced or serviced prior to reaching its calibration range limit; and wherein if it is determined that said detector block i is a stable detector block at said time T, said method further comprising:

(i1) determining if said detector block i has reached its calibration range limit and should be replaced or serviced by computing if said Hist(i,J(T)) is greater than or equal to a predetermined number designating the photomultiplier detector block limit of calibration range, and (j) providing an output signal advising that at said time T said photomultiplier detector block i is a stable detector block; and wherein if it is determined that said detector block i has reached its calibration range limit, said method further comprises:

(j1) providing an output signal advising that said detector block i has reached its calibration range limit and should be replaced or serviced as soon as possible to avoid photomultiplier detector block failure;

wherein if it is determined that said detector block i is a stable detector block and has not reached its calibration range limit at said time T, said method further comprises:

(k) determining if said detector block i is a stable detector block with a high degree of stability, a medium degree of stability, or a marginal degree of stability at said time T, wherein:

(k1) if the value of av(i) is less than a first predetermined value, then said detector block i has a high degree of stability;

(k2) if the value of av(i) is greater than or equal to said first predetermined value and less than a second predetermined value, then said detector block i has a medium degree of stability; and (k3) if the value of av(i) is greater than or equal to said second predetermined value, then said detector block has a marginal degree of stability; and said method further comprising:

(1) providing an output signal advising that said photomultiplier detector block i has said av(i), said sd(i) and said degree of stability as determined in step (k).

12. A method according to claim 11, wherein said predetermined number designating the photomultiplier detector block limit of calibration range is 15.

13. A method according to claim 12, wherein said steps are periodically repeated for said PET scanner for a time $t=t_0$ through T.

14. A method according to claim 11, wherein said steps are repeated for each photomultiplier detector block i=1 through I of a PET scanner, wherein I is a total number of photomultiplier detector block of the PET scanner being calibrated.

15. A computer based apparatus for the preventive maintenance of photomultiplier detector blocks of a PET scanner, the apparatus comprising:

means for calibrating photomultiplier detector blocks i=1 through i=I of a PET scanner, including means for iteratively adjusting a gain by which photomultipliers in said photomultiplier detector block i amplify a detected signal, said apparatus further comprising, (a) memory for storing:

(a1) a record of a number of iterative adjustments that are necessary to calibrate the gain of a photomultiplier detector block i at a time $t_0$, a time $t_1$ and a time T, where $T>t_1>t_0$, said record is designated as Histo(i,j(t));

(a2) an average value of the number of iterative adjustments necessary to calibrate said detector block i, designated av(i), and a standard deviation value of the number of iterative adjustments necessary to calibrate said detector block i, designated as sd(i);

(b) processing means to:

(b1) compute the average number of iterative adjustments necessary to calibrate said detector block i for said time $t_0$ through said time T, and storing said average value through said time T in said memory;

(b2) compute the standard deviation of the number of iterative adjustments necessary to calibrate said detector block i for said time $t_0$ through said time T, and store said standard deviation value through said time T in said memory;

(b3) compute at said time T if: $\text{Histo}(i,j(T))>av(i)+2sd(i)$ to determine that said detector block i is an intermittent unstable block;

(b4) compute at said time T if: $\text{Histo}(i,J(T))>\text{Histo}(i,j(T-1))>\text{Histo}(i,j(T-2))>av(i)$ to determine that said detector block i is a drifting unstable block;

(b5) determine that said photomultiplier block i is a stable detector block, if said detector block i is not an intermittent unstable detector block and is not a drifting unstable detector block, and to generate an output signal advising that at said time T said photomultiplier detector block i is a stable detector block; and (b6) compute if said number of iterative adjustments required to calibrate said photomultiplier detector block i at said time T is greater than or equal to a predetermined number designating the photomultiplier detector block limit of calibration range, to determine that the photomultiplier detector block i is at its calibration range limit and should be replaced or serviced; and to generate an output signal for advising that said detector block i has reached its calibration range limit and should be replaced or serviced as soon as possible to avoid photomultiplier detector block failure.

16. An apparatus according to claim 15, wherein said processing means compares said value Histo(i,j(T)) to said predetermined number and said predetermined number is 15.

17. An apparatus according to claim 15, wherein said apparatus further includes:

(a) additional memory for storing:

(a3) the number of iterative adjustments required to calibrate said intermittent unstable detector block i at said time T as npeak(i,jp)=T, wherein jp denotes the number of intermittent peaks detected for said photomultiplier detector block i from time $t=t_0$ through $t=T$;

(b) additional processing means to:

(b3A) calculate the minimum time designated mintp, between peaks of said intermittently unstable detector block i from said time $t_0$ to said time T; and (b3B) generate an output signal to advise servicing or changing photomultiplier detector block i prior to the time=T+mintp when a new peak is likely to occur.

18. An apparatus as recited in claim 17, wherein said processing means further includes:

(7) counting means for analyzing each photomultiplier detector block i=1 through I of a PET scanner, wherein I is a total number of photomultiplier detector blocks of the PET scanner to be calibrated.

19. An apparatus as recited in claim 18, wherein said apparatus further includes:

(a) memory for storing:

(5) each of the values generated from said time $t=t_0$ through T;

(b) processing means to:

(8) actuate said memory to store each of the values generated from said time $t=t_0$ through T, and periodically update said values for said PET scanner.

20. An apparatus according to 15, wherein said apparatus further includes:

(a) additional memory for storing:

(a4) a time of failure of said drifting unstable photomultiplier detector block i, designated tf(i), when said detector block i will reach said predetermined calibration range limit of iterative adjustments;

(b) additional processing means to:

(b4A) compute a time of failure of said drifting unstable photomultiplier detector block i, designated tf(i), when said detector block i will reach said predetermined calibration range limit of iterative adjustments designated Histo(i,j(tf(i))) by satisfying the equation:

$$tf(i)=[-B+\{BB-4A(C-Z)\}exp0.5]/2A$$

wherein

A=0.5[Histo(i,j(T−2))−2 Histo(i,j(T−1))+Histo(i,J(T))],

B=−0.5[3 Histo(i,j(T−2))−4 Histo(i,j(T−1))+Histo (i,J(T))],

C=Histo(i,j(T−2)), and

Z=said predetermined number designating the detector block i calibration range limit of iterative adjustments; and store said tf(i) in said memory, and;

(b4B) generate an output signal to advise that photomultiplier detector block i is a drifting unstable block i at time T, and is likely to reach the limit of its calibration range at a time=(T−2)+tf(i).

21. An apparatus as recited in claim 20, wherein said processing means further includes:

(7) counting means for analyzing each photomultiplier detector block i=1 through I of a PET scanner, wherein I is a total number of photomultiplier detector blocks of the PET scanner to be calibrated.

22. An apparatus as recited in claim 21, wherein said apparatus further includes:

(a) memory for storing:

(5) each of the values generated from said time $t=t_0$ through T;

(b) processing means to:

(8) actuate said memory to store each of the values generated from said time $t=t_0$ through T, and periodically update said values for said PET scanner.

23. An apparatus as recited in claim 15, wherein said apparatus further includes:

(a) additional memory for storing:

(a5) that said photomultiplier detector block i at time t=T is a stable detector block with either a high degree of stability, a medium degree of stability or a marginal degree of stability;

(b) additional processing means to:

(b5A) compute if the value of av(i) is less than a first predetermined value, to determine that said detector block has a high degree of stability;

(b5B) compute if the value of av(i) is greater than or equal to said first predetermined value and less than a second predetermined value, to determine that said detector block has a medium degree of stability; and (b5C) compute if the value of av(i) is greater than or equal to said second predetermined value, to determine that said detector block has a marginal degree of stability;

(b5D) store in said memory that said detector block i at time T is a stable detector block with either said high degree of stability, said medium degree of stability, or said marginal degree of stability; and (b5E) generate an output signal to advise that at time t=T photomultiplier detector block i is a stable detector block and that said photomultiplier detector block has said av(i), said sd(i) and one of said degree of stability.

24. An apparatus as recited in claim 23, wherein said processing means further includes:

(7) counting means for analyzing each photomultiplier detector block i=1 through I of a PET scanner, wherein I is a total number of photomultiplier detector blocks of the PET scanner to be calibrated.

25. An apparatus as recited in claim 24, wherein said apparatus further includes:

(a) additional memory for storing:

(a5) each of the values generated from said time $t=t_0$ through T;

(b) additional processing means to:

(b8) actuate said memory to store each of the values generated from said time $t=t_0$ through T, and periodically update said values for said PET scanner.

26. An apparatus as recited in claim 15, wherein said processing means further includes:

(7) counting means for analyzing each photomultiplier detector block i=1 through I of a PET scanner, wherein I is a total number of photomultiplier detector blocks of the PET scanner to be calibrated.

27. An apparatus as recited in claim 26, wherein said apparatus further includes:

(a) additional memory for storing:

(a5) each of the values generated from said time $t=t_0$ through T;

(b) additional processing means to:

(b8) actuate said memory to store each of the values generated from said time $t=t_0$ through T, and periodically update said values for said PET scanner.

* * * * *